(12) United States Patent
Yin et al.

(10) Patent No.: US 11,996,978 B2
(45) Date of Patent: May 28, 2024

(54) DEVICE BINDING METHOD AND TERMINAL DEVICE

(71) Applicant: Petal Cloud Technology Co., Ltd., Dongguan (CN)

(72) Inventors: Jiaxin Yin, Nanjing (CN); Puchao Zhang, Dublin (IE)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

(21) Appl. No.: 17/919,199

(22) PCT Filed: Mar. 8, 2021

(86) PCT No.: PCT/CN2021/079519
§ 371 (c)(1),
(2) Date: Oct. 14, 2022

(87) PCT Pub. No.: WO2021/208634
PCT Pub. Date: Oct. 21, 2021

(65) Prior Publication Data
US 2023/0179473 A1 Jun. 8, 2023

(30) Foreign Application Priority Data

Apr. 17, 2020 (CN) .......................... 202010307428.6

(51) Int. Cl.
*H04L 41/0806* (2022.01)
(52) U.S. Cl.
CPC ................ *H04L 41/0806* (2013.01)
(58) Field of Classification Search
CPC ............ H04L 41/0806; H04L 65/1033; H04L 65/1069; H04L 65/1073; H04L 67/12;
(Continued)

(56) References Cited

U.S. PATENT DOCUMENTS 9,813,505 B2 * 11/2017 Pai .......................... G06F 9/547
2016/0112470 A1 * 4/2016 Pai ...................... H04L 65/1073
709/223
(Continued)

FOREIGN PATENT DOCUMENTS

CN 104639498 A 5/2015
CN 104936304 A 9/2015
(Continued)

OTHER PUBLICATIONS

Deahl, "Amazon is making it easier to set up new Internet of Things gadgets," https://www.theverge.com/2018/9/20/17883370/amazon-wifi-wi-fi-simple-setup-tp-link-alexa-smart-home, Total 3 pages (Sep. 21, 2018).

(Continued)

*Primary Examiner* — Michael Won
(74) *Attorney, Agent, or Firm* — Leydig, Voit & Mayer, Ltd.

(57) ABSTRACT

A device binding method is provided. The method includes: a user terminal collects a signal at a collection position, generates a first signal fingerprint, and sends the first signal fingerprint and a corresponding first account to a server. An intelligent terminal collects a signal at a set position, generates a second signal fingerprint, and sends the second signal fingerprint and a corresponding device identifier of the intelligent terminal to the server. The server determines that the second signal fingerprint matches the first signal fingerprint, to determine that the second signal fingerprint corresponds to the first account. The server binds the intelligent terminal to the first account based on a correspondence between the second signal fingerprint and the device identifier of the intelligent terminal.

15 Claims, 10 Drawing Sheets

(58) Field of Classification Search
CPC ............... H04L 65/1046; H04L 63/083; H04L 63/0876; H04L 63/107; H04W 12/06; H04W 12/63; H04W 12/79
See application file for complete search history.

(56) References Cited

U.S. PATENT DOCUMENTS

| | | | |
|---|---|---|---|
| 2017/0232300 A1* | 8/2017 | Tran | G06F 1/163 |
| | | | 434/247 |
| 2019/0130019 A1 | 5/2019 | De et al. | |
| 2020/0077265 A1* | 3/2020 | Singh | H04L 63/0272 |
| 2022/0201476 A1* | 6/2022 | Naujok | H04W 12/72 |
| 2022/0255650 A1* | 8/2022 | Daoura | H04W 4/029 |
| 2023/0216947 A1* | 7/2023 | Bernardi | H04L 63/10 |
| | | | 713/150 |

FOREIGN PATENT DOCUMENTS

| | | |
|---|---|---|
| CN | 106102184 A | 11/2016 |
| CN | 106211264 A | 12/2016 |
| CN | 106385352 A | 2/2017 |
| CN | 106549977 A | 3/2017 |
| CN | 107071862 A | 8/2017 |
| CN | 107659489 A | 2/2018 |
| CN | 108063704 A | 5/2018 |
| CN | 108541078 A | 9/2018 |
| CN | 109600252 A | 4/2019 |
| CN | 110308660 A | 10/2019 |
| EP | 2661108 A1 | 11/2013 |

OTHER PUBLICATIONS

Porter, "Amazon is simplifying device setup with 'Certified for Humans' program," https://www.theverge.com/2019/9/25/20883923/amazon-certified-for-humans-alexa-smart-home-certification-program-simple-setup-updates, Total 3 pages (Sep. 26, 2019).

* cited by examiner

DEVICE BINDING METHOD AND TERMINAL DEVICE

CROSS-REFERENCE TO RELATED APPLICATIONS

This application is a national stage of International Application No. PCT/CN2021/079519, filed on Mar. 8, 2021, which claims priority to Chinese Patent Application No. 202010307428.6, both filed on Apr. 17, 2020. Both of the aforementioned applications are hereby incorporated by reference in their entireties.

TECHNICAL FIELD

Embodiments of this application relate to the field of smart appliances, and in particular, to a device binding method and a terminal device.

BACKGROUND

A smart home system uses advanced network, communication, and automatic control technologies to make modern home life more secure, convenient, efficient, fast, intelligent, and personalized, greatly improving modern human life.

Currently, in a smart home application scenario, after purchasing an intelligent terminal, a user needs to perform various complex configuration processes on a user terminal, to generate a binding relationship between the intelligent terminal and a user account, so that the intelligent terminal is visible on the user terminal logging in to the user account, and the user can control and listen to the intelligent terminal by using the user terminal.

It is clearly that, in the foregoing manner, because the user needs to perform various complex configuration processes to bind the intelligent terminal to the user account, a process of binding the intelligent terminal to the user account is complex and time-consuming.

SUMMARY

This application provides a device binding method and a terminal device, to overcome a problem that a process of binding an intelligent terminal to a user account is complex and time-consuming.

According to a first aspect, this application provides a device binding method, including: A user terminal collects a signal at a collection position, and generates a first signal fingerprint. The user terminal sends the first signal fingerprint and a corresponding first account to a server. An intelligent terminal collects a signal at a set position, and generates a second signal fingerprint. The intelligent terminal sends the second signal fingerprint and a corresponding device identifier of the intelligent terminal to the server. The server determines that the second signal fingerprint matches the first signal fingerprint, to determine that the second signal fingerprint is corresponding to the first account. The server binds the intelligent terminal to the first account based on a correspondence between the second signal fingerprint and the device identifier of the intelligent terminal.

The user terminal collects the signal at the collection position, generates the first signal fingerprint, and sends the first signal fingerprint and the corresponding first account to the server. The intelligent terminal collects the signal at the set position, generates the second signal fingerprint, and sends the second signal fingerprint and the corresponding device identifier of the intelligent terminal to the server. After determining that the second signal fingerprint matches the first signal fingerprint, the server determines that the second signal fingerprint is corresponding to the first account, to bind the intelligent terminal to the first account based on the correspondence between the second signal fingerprint and the device identifier of the intelligent terminal, so that the intelligent terminal is bound to an account to which the intelligent terminal belongs. Compared with the conventional technology, in this manner, various complex configuration processes are not required, so that binding efficiency is improved, binding time is shortened, and user experience is improved. In addition, the first account corresponding to the intelligent terminal can be determined only through matching of signal fingerprints, so as to implement binding between the intelligent terminal and the corresponding first account. A binding step is simple and easy to perform. In addition, because determining of the account (that is, the first account) to which the intelligent terminal belongs is related to the second signal fingerprint corresponding to the set position of the intelligent terminal and the first signal fingerprint corresponding to the collection position, and is irrelevant to an account for purchasing the intelligent terminal, accurate binding of the intelligent terminal can be implemented.

In a possible implementation, the method further includes: When sending the first signal fingerprint and the corresponding first account to the server, the user terminal further sends a first area identifier corresponding to the first signal fingerprint to the server. The server determines that the second signal fingerprint matches the first signal fingerprint, to determine that the second signal fingerprint is corresponding to the first area identifier. The server marks the intelligent terminal by using the first area identifier based on the correspondence between the second signal fingerprint and the device identifier of the intelligent terminal.

The user terminal sends the first area identifier corresponding to the first signal fingerprint to the server, so that after determining that the second signal fingerprint matches the first signal fingerprint, the server determines that the second signal fingerprint is corresponding to the first area identifier, and marks the intelligent terminal by using the first area identifier based on the correspondence between the second signal fingerprint and the device identifier of the intelligent terminal. This implements determining of an area to which the set position of the intelligent terminal belongs. Compared with the conventional technology, in this manner, various complex configuration processes are not required, so that area determining efficiency is improved, area determining time is shortened, and user experience is improved. In addition, the area to which the set position of the intelligent terminal belongs can be determined only through matching of signal fingerprints. An area determining step is simple and easy to perform.

In a possible implementation, that the intelligent terminal sends the second signal fingerprint and a corresponding device identifier of the intelligent terminal to the server includes: The intelligent terminal sends the second signal fingerprint and the corresponding device identifier of the intelligent terminal to the server by using a central device. Alternatively, the intelligent terminal sends the second signal fingerprint and the corresponding device identifier of the intelligent terminal to the server by using a virtual SIM card.

According to a second aspect, this application provides a device binding method for a server, including: receiving a first signal fingerprint and a corresponding first account that are sent by a user terminal, where the first signal fingerprint is generated by a signal collected by the user terminal at a collection position; receiving a second signal fingerprint and a corresponding device identifier of an intelligent terminal that are sent by the intelligent terminal, where the second signal fingerprint is generated by a signal collected by the intelligent terminal at a set position; determining that the second signal fingerprint matches the first signal fingerprint, to determine that the second signal fingerprint is corresponding to the first account; and binding the intelligent terminal to the first account based on a correspondence between the second signal fingerprint and the device identifier of the intelligent terminal.

In a possible implementation, the method further includes: when receiving the first signal fingerprint and the corresponding first account that are sent by the user terminal, further receiving a first area identifier that is corresponding to the first signal fingerprint and sent by the user terminal; determining that the second signal fingerprint matches the first signal fingerprint, to determine that the second signal fingerprint is corresponding to the first area identifier; and marking the intelligent terminal by using the first area identifier based on the correspondence between the second signal fingerprint and the device identifier of the intelligent terminal.

In a possible implementation, the method further includes: sending first configuration information to the user terminal, where the first configuration information includes the device identifier of the intelligent terminal and the first area identifier, so that the user terminal sets an operation control of the intelligent terminal based on the first configuration information.

In a possible implementation, the method further includes: sending second configuration information to the intelligent terminal, where the second configuration information includes the first account and the first area identifier, so that the intelligent terminal determines, based on the second configuration information, an account and an area to which the intelligent terminal belongs.

In a possible implementation, the method further includes: receiving a third signal fingerprint sent by the intelligent terminal, where the third signal fingerprint is generated by the signal collected by the intelligent terminal at the set position; and updating the first signal fingerprint by using the third signal fingerprint.

In a possible implementation, the method further includes: sending third configuration information to the intelligent terminal, where the third configuration information is used to indicate device configuration information of the intelligent terminal that is disposed in an area indicated by the first area identifier, so that the intelligent terminal performs device configuration based on the third configuration information.

In a possible implementation, the method further includes: binding the intelligent terminal to a second account, where the second account is associated with the first account.

In a possible implementation, the method further includes: receiving fourth configuration information sent by the user terminal, where the fourth configuration information includes operation permission of the first account for the intelligent terminal and operation permission of the second account for the intelligent terminal; and sending the fourth configuration information to the intelligent terminal, so that the intelligent terminal determines the operation permission of the first account and the operation permission of the second account based on the fourth configuration information.

In a possible implementation, the method further includes: receiving network configuration information that is corresponding to the first account and sent by the user terminal; and sending, to the intelligent terminal, the network configuration information corresponding to the first account, so that the intelligent terminal connects to an access network based on the network configuration information corresponding to the first account.

In a possible implementation, the receiving a second signal fingerprint and a corresponding device identifier of an intelligent terminal that are sent by the intelligent terminal includes: receiving, by using a central device or a virtual SIM card, the second signal fingerprint and the corresponding device identifier of the intelligent terminal that are sent by the intelligent terminal.

According to a third aspect, this application provides a device binding method for a user terminal, including: collecting a signal at a collection position, and generating a first signal fingerprint; and sending the first signal fingerprint and a corresponding first account to a server, so that after determining that a second signal fingerprint that is sent by an intelligent terminal and that is at a set location matches the first signal fingerprint, the server binds the intelligent terminal to the first account.

In a possible implementation, the method further includes: when sending the first signal fingerprint and the corresponding first account to the server, further sending a first area identifier corresponding to the first signal fingerprint to the server, so that after determining that the second signal fingerprint that is sent by the intelligent terminal and that is at the set location matches the first signal fingerprint, the server marks the intelligent terminal by using the first area identifier.

In a possible implementation, the method further includes: receiving first configuration information sent by the server, where the first configuration information includes a device identifier of the intelligent terminal and the first area identifier; and setting an operation control of the intelligent terminal based on the first configuration information.

In a possible implementation, the method further includes: sending fourth configuration information to the server, where the fourth configuration information includes operation permission of the first account for the intelligent terminal and operation permission of a second account for the intelligent terminal, and the second account is associated with the first account, so that the server determines the operation permission of the first account and the operation permission of the second account based on the fourth configuration information.

In a possible implementation, the method further includes: sending, to the server, network configuration information corresponding to the first account.

According to a fourth aspect, this application provides a device binding method for an intelligent terminal, including: collecting a signal at a set position, and generating a second signal fingerprint; and sending the second signal fingerprint and a corresponding device identifier of the intelligent terminal to a server, so that after determining that the second signal fingerprint matches a first signal fingerprint sent by a user terminal, the server binds the intelligent terminal to a first account corresponding to the first signal fingerprint.

In a possible implementation, the method includes: receiving second configuration information sent by the server, where the second configuration information includes the first account and a first area identifier, and the first area identifier corresponds to the first signal fingerprint; and determining, based on the second configuration information, an account and an area to which the intelligent terminal belongs.

In a possible implementation, the method further includes: collecting a signal at the set position, and generating a third signal fingerprint; and sending the third signal fingerprint to the server, so that the server updates the first signal fingerprint by using the third signal fingerprint.

In a possible implementation, the method includes: receiving third configuration information sent by the server, where the third configuration information is used to indicate device configuration information of the intelligent terminal that is disposed in an area indicated by the first area identifier, and the first area identifier corresponds to the first signal fingerprint; and performing device configuration based on the third configuration information.

In a possible implementation, the method further includes: receiving fourth configuration information sent by the server, where the fourth configuration information includes operation permission of the first account for the intelligent terminal and operation permission of a second account for the intelligent terminal, and the second account is associated with the first account; and determining the operation permission of the first account and the operation permission of the second account based on the fourth configuration information.

In a possible implementation, the method further includes: receiving network configuration information that is corresponding to the first account and sent by the server; and connecting to an access network based on the network configuration information corresponding to the first account.

In a possible implementation, the sending the second signal fingerprint and a corresponding device identifier of the intelligent terminal to a server includes: sending the second signal fingerprint and the corresponding device identifier of the intelligent terminal to the server by using a central device or a virtual SIM card.

According to a fifth aspect, this application provides a terminal device, including: a communication module, configured to communicate with another device; one or more memories, configured to store one or more computer programs; and one or more processors, configured to execute the one or more computer programs, so that the terminal device performs the method according to any implementation of the second aspect.

According to a sixth aspect, this application provides a terminal device, including: a communication module, configured to communicate with another device; one or more memories, configured to store one or more computer programs; and one or more processors, configured to execute the one or more computer programs, so that the terminal device performs the method according to any implementation of the third aspect.

According to a seventh aspect, this application provides a terminal device, including: a communication module, configured to communicate with another device; one or more memories, configured to store one or more computer programs; and one or more processors, configured to execute the one or more computer programs, so that the terminal device performs the method according to any implementation of the fourth aspect.

According to an eighth aspect, this application provides a computer-readable storage medium, including a computer program. When the computer program is executed on a computer, the computer is enabled to perform the method according to any one of the second aspect to the fourth aspect.

According to a ninth aspect, this application provides a computer program. When the computer program is executed by a computer, the computer program is used to perform the method according to any one of the second aspect to the fourth aspect.

According to a tenth aspect, this application provides a chip, including a processor and a memory. The memory is configured to store a computer program, and the processor is configured to invoke and run the computer program stored in the memory, to perform the method according to any one of the second aspect to the fourth aspect.

DESCRIPTION OF EMBODIMENTS

To make the objectives, technical solutions, and advantages of this application clearer, the following clearly and completely describes the technical solutions in this application with reference to the accompanying drawings in this application. It is clearly that the described embodiments are some but not all of embodiments of this application. All other embodiments obtained by a person of ordinary skill in the art based on embodiments of this application without creative efforts shall fall within the protection scope of this application.

In the specification, embodiments, claims, and accompanying drawings of this application, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. In addition, "at least one of the following items (pieces)" or a similar expression thereof means any combination of these items, including a single item (piece) or any combination of a plurality of items (pieces). For example, at least one (piece) of a, b, or c may indicate a, b, c, a and b, a and c, b and c, or a, b, and c, where a, b, and c may be singular or plural.

Figure 1:
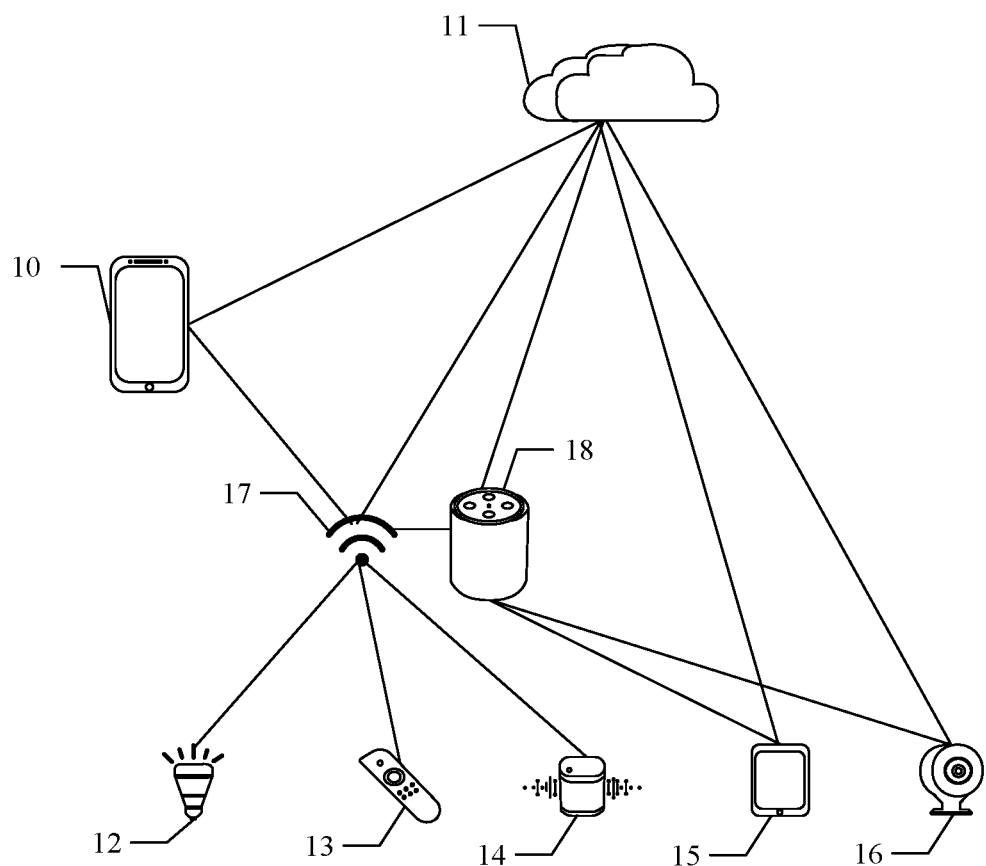
FIG. 1 is a schematic diagram of an application scenario of a device binding method.

This application provides a device binding method. The device binding method may implement binding between an intelligent terminal and a user account. The following first describes an application scenario of the device binding method. FIG. 1 is a schematic diagram of an application scenario of a device binding method. As shown in FIG. 1, the application scenario may include: at least one user terminal 10, a server 11, at least one of intelligent terminals 12 to 16, and at least one of central devices 17 and 18.

The user terminal 10 may be, for example, a terminal device having a man-machine interaction function, such as a mobile phone or a tablet computer. The user terminal may interact with the server 11 by using a network service provided by a mobile operator; or may be connected to a wireless local area network (for example, a home gateway), and interact with the server 11 by using the wireless local area network.

The server 11 may be, for example, a physical server, or may be a cloud server. This is not specially limited herein.

The intelligent terminals 12 to 16 may be, for example, a lamp, a socket, a refrigerator, a washing machine, an air conditioner, an oven, a rice cooker, a television set, or a floor sweeping robot. This is not specially limited herein.

The central devices 17 and 18 may be, for example, a home gateway, a smart sound box, or a television set-top box. The central devices 17 and 18 are all connected to a network, to implement interaction between the central device and the server 11.

The central devices 17 and 18 may be divided into a central device having a man-machine interaction function and a central device having no man-machine interaction function. The central device having the man-machine interaction function may be, for example, the smart sound box, and the central device having no human-computer interaction function may be, for example, the home gateway or the television set-top box.

A restricted network is disposed on the central devices 17 and 18, and the restricted network is specially configured to provide a network service for the intelligent terminals 12 to 16 that are not connected to a network.

The intelligent terminals 12 to 16 are all configured with access information of the restricted network before delivery, so that the intelligent terminals 12 to 16 access the central devices 17 and 18 by using the configured access information of the restricted network when the intelligent terminals 12 to 16 are not connected to the network, and the intelligent terminals 12 to 16 interact with the server 11 by using the central devices 17 and 18 that access the network.

Figure 2A:
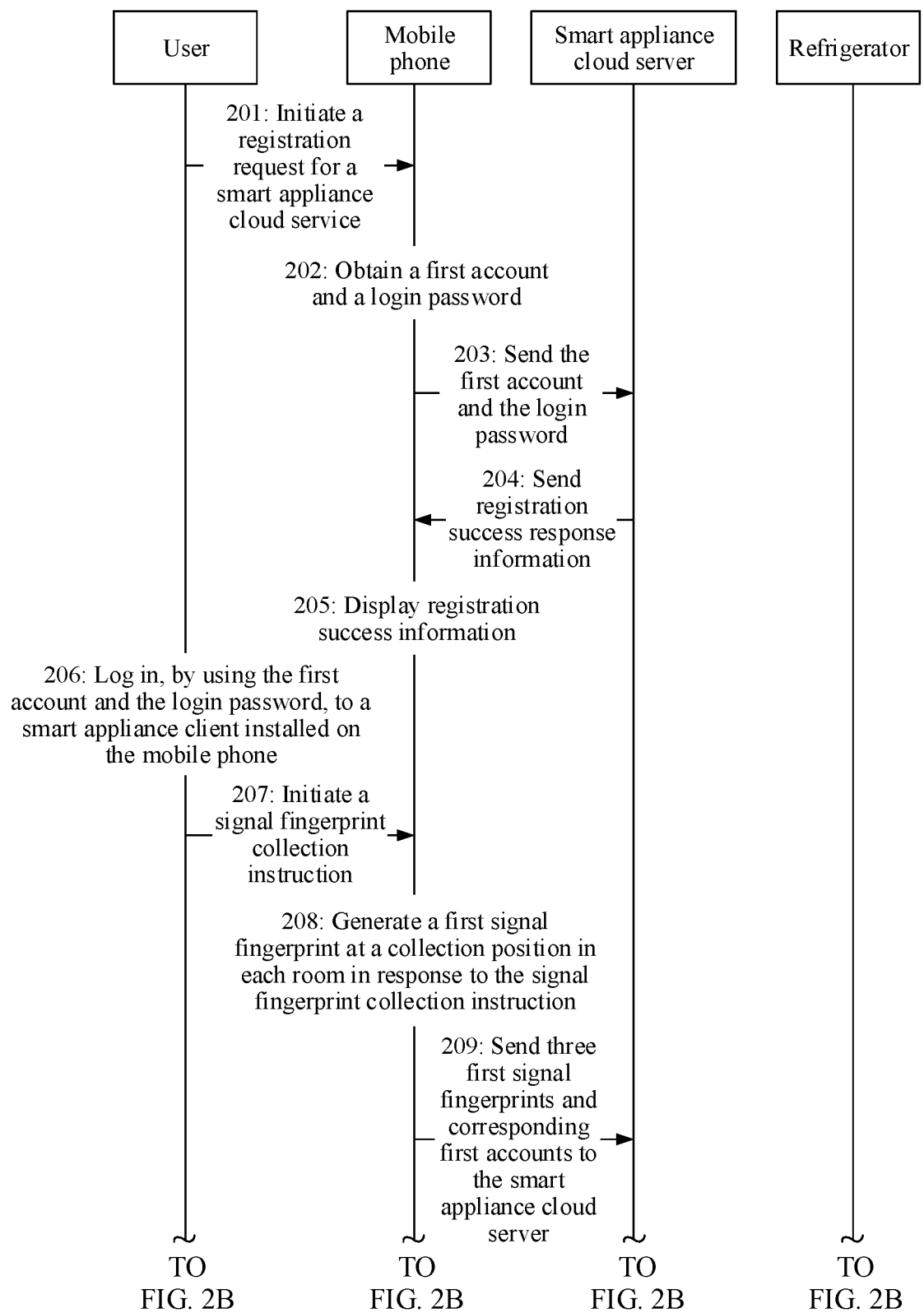
FIG. 2A and FIG. 2B are a schematic flowchart of a refrigerator binding method according to an embodiment of this application.
Figure 2B:
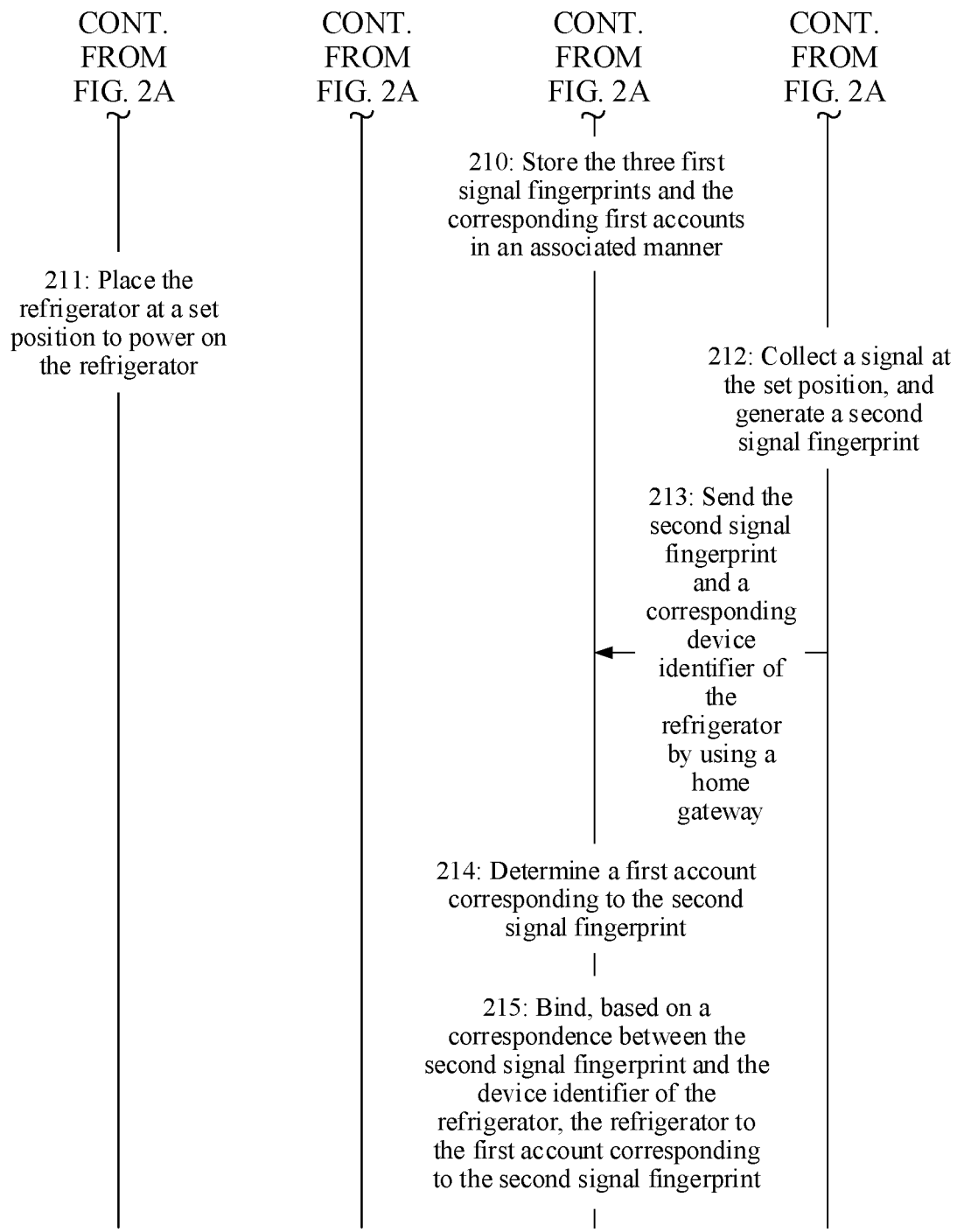

Based on the foregoing application scenario, the following describes, by using an example, a process of binding the intelligent terminal to an account to which the intelligent terminal belongs. FIG. 2A and FIG. 2B are a schematic flowchart of a refrigerator binding method according to an embodiment of this application. In FIG. 2A and FIG. 2B, an intelligent terminal set by a user is a refrigerator, the refrigerator is one of the at least one intelligent terminal in FIG. 1, a user terminal used by the user is a mobile phone, the mobile phone is one of the at least one user terminal in FIG. 1, a central device is a home gateway, the home gateway is one of the at least one central device in FIG. 1, a server is a smart appliance cloud server, the user disposes the refrigerator in a house of the user, and the house has two bedrooms and one living room. Based on this, the refrigerator binding method may include the following steps:

201: The user initiates a registration request for a smart appliance cloud service to the mobile phone.

Specifically, the user may initiate the registration request for the smart appliance cloud service to the mobile phone by starting a smart appliance client installed on the mobile phone and tapping a registration control on a display interface of the smart appliance client.

202: The mobile phone receives the registration request and obtains a first account and a login password in response to the registration request, where the first account is an account used by the user to log in to the smart appliance client.

Specifically, the mobile phone receives and responds to the registration request, so that the smart appliance client provides an account registration interface on the display interface. The user may enter the first account and the login password on the account registration interface, so that the mobile phone obtains the first account and the login password.

203: The mobile phone sends the first account and the login password to the smart appliance cloud server.

204: The smart appliance cloud server receives the first account and the login password, determines whether an account that is the same as the first account exists in accounts stored in the smart appliance cloud server, and if the account does not exist, sends registration success response information to the mobile phone.

205: The mobile phone receives the registration success response information, and displays registration success information, to notify the user that the account is successfully registered, and the user can log in to the smart appliance client by using the first account and the login password.

It should be noted that, if the smart appliance cloud server stores the account that is the same as the first account, an indication for re-obtaining the first account and the login password needs to be sent to the mobile phone until registration succeeds.

206: The user logs in, by using the first account and the login password, to the smart appliance client installed on the mobile phone.

207: The user walks in different rooms in the house while holding the mobile phone, and initiates a signal fingerprint collection instruction to the mobile phone each time the user walks to a collection position in a room.

208: The mobile phone receives and responds to the signal fingerprint collection instruction, collects a signal at a collection position in each room, and generates a first signal fingerprint at the collection position in each room based on the signal collected at the collection position in each room, where a quantity of first signal fingerprints is the same as a quantity of collection positions, and one collection position is corresponding to one first signal fingerprint.

A process of collecting a signal at a collection position and generating a first signal fingerprint at the collection position includes: first driving a signal collection program, detecting a signal at the collection position, collecting identification information and signal strength of each detected signal, and packaging identification information and signal strength of all detected signals to obtain the first signal fingerprint at the collection position.

Because the user disposes the refrigerator in the house of the user, and the house of the user has two bedrooms and one living room, one collection position may be selected in each of the living room and the two bedrooms. In this way, three collection positions and three first signal fingerprints are obtained. The three collection positions are in a one-to-one correspondence with the three first signal fingerprints. The three collection positions are respectively a first collection position to a third collection position, the first collection position is in the living room, the second collection position is in a first room, and the third collection position is in a second room.

The first signal fingerprint at the first collection position is shown in Table 1. In Table 1, the first signal fingerprint at the first collection position includes five signals, and all the five signals are Wi-Fi signals. Identification information SSID of each Wi-Fi signal and signal strength RSSI of each Wi-Fi signal are shown in Table 1.

TABLE 1

| SSID | RSSI |
| --- | --- |
| AP 1 | 80 |
| AP 2 | 123 |
| AP 3 | 40 |
| AP 4 | 25 |
| AP 5 | 67 |

The first signal fingerprint at the second collection position is shown in Table 2. In Table 2, the first signal fingerprint at the second collection position includes four signals, and all the four signals are Wi-Fi signals. Identification information SSID of each Wi-Fi signal and signal strength RSSI of each Wi-Fi signal are shown in Table 2.

TABLE 2

| SSID | RSSI |
| --- | --- |
| AP 1 | 100 |
| AP 2 | 74 |
| AP 3 | 20 |
| AP 5 | 36 |

The first signal fingerprint at the third collection position is shown in Table 3. In Table 3, the first signal fingerprint at the third collection position includes five signals, and all the five signals are Wi-Fi signals. Identification information SSID of each Wi-Fi signal and signal strength RSSI of each Wi-Fi signal are shown in Table 3.

TABLE 3

| SSID | RSSI |
| --- | --- |
| AP 1 | 137 |
| AP 2 | 56 |
| AP 3 | 87 |
| AP 4 | 60 |
| AP 5 | 25 |

It should be noted that, in another embodiment of this application, in a process of generating a first signal fingerprint at a collection position, when identification information and signal strength of each detected signal are collected, at least one of a signal class, a signal timestamp, a change speed of the signal strength, other detectable signal-related public information, and the like of each detected signal may be further collected. The signal class includes a Wi-Fi signal, a Bluetooth signal, a UWB signal, and the like. When the identification information and the signal strength of all the detected signals are packed, at least one of signal classes, signal timestamps, change speeds of the signal strength, other detectable signal-related public information, and the like of all the detected signals also need to be packed, to obtain the first signal fingerprint at the collection position.

209: After generating the first signal fingerprint corresponding to each collection position, the mobile phone sends the foregoing three first signal fingerprints and corresponding first accounts to the smart appliance cloud server.

210: The smart appliance cloud server receives the three first signal fingerprints and the corresponding first accounts that are sent by the mobile phone, and stores the three first signal fingerprints and the corresponding first accounts in an associated manner.

It can be learned from the foregoing that, the signal is collected at the collection position, the first signal fingerprint is generated, and the first signal fingerprint and the corresponding first account are sent to the smart appliance cloud server, to provide a data basis for the smart appliance cloud server to determine an account to which the refrigerator belongs.

211: After purchasing the refrigerator, the user places the refrigerator at a set position (for example, a position in the living room) to power on the refrigerator.

212: After being powered on, the refrigerator collects a signal at the set position, and generates a second signal fingerprint. That is, the refrigerator drives a signal collection program, detects a signal at the set position, collects identification information and signal strength of each detected signal, and packs identification information and signal strength of all detected signals to obtain the second signal fingerprint.

The second signal fingerprint is shown in Table 4. In Table 4, the second signal fingerprint includes five signals, and all the five signals are Wi-Fi signals. Identification information S SID of each Wi-Fi signal and signal strength RSSI of each Wi-Fi signal are shown in Table 4.

TABLE 4

| SSID | RSSI |
| --- | --- |
| AP 1 | 85 |
| AP 2 | 115 |
| AP 3 | 45 |
| AP 4 | 30 |
| AP 5 | 60 |

It should be noted that, in another embodiment of this application, in a process of generating a second signal fingerprint, when identification information and signal strength of each detected signal are collected, at least one of a signal class, a signal timestamp, a change speed of the signal strength, other detectable signal-related public information, and the like of each detected signal may be further collected. The signal class includes a Wi-Fi signal, a Bluetooth signal, a UWB signal, and the like. When the identification information and the signal strength of all the detected signals are packed, at least one of signal classes, signal timestamps, change speeds of the signal strength, other detectable signal-related public information, and the like of all the detected signals also need to be packed, to obtain the second signal fingerprint.

213: The refrigerator sends the second signal fingerprint and a corresponding device identifier of the refrigerator to the smart appliance cloud server by using the home gateway.

Specifically, the refrigerator is connected to the home gateway by using the configured access information of the restricted network, and sends the second signal fingerprint and the corresponding device identifier of the refrigerator to the home gateway. The home gateway receives the second signal fingerprint and the corresponding device identifier of the refrigerator, and sends the second signal fingerprint and the corresponding device identifier of the refrigerator to the smart appliance cloud server.

Because the home gateway is a central device selected by the refrigerator from central devices that can be detected by the refrigerator, the home gateway may be a home gateway set by the user, or may be a home gateway set by a neighbor of the user. Based on this, before the refrigerator sends the second signal fingerprint and the corresponding device identifier of the refrigerator by using the home gateway, the refrigerator needs to select a central device (that is, the home gateway) from the central devices that can be detected by the refrigerator, and then the refrigerator sends the second signal fingerprint and the corresponding device identifier of the refrigerator by using the selected central device (that is, the home gateway).

It should be noted that, in another embodiment of this application, the refrigerator may further send the second signal fingerprint and the corresponding device identifier of the refrigerator to the smart appliance cloud server by using a virtual SIM card. That is, when the refrigerator is delivered from a factory, a virtual SIM card is disposed in the refrigerator, and the refrigerator is connected to a network by using the virtual SIM card, so that the second signal fingerprint and the device identifier of the refrigerator are sent to the smart appliance cloud server by using the virtual SIM card.

It can be learned from the foregoing that, the refrigerator collects the signal at the set position, generates the second signal fingerprint, and sends the second signal fingerprint and the corresponding device identifier of the refrigerator to the smart appliance cloud server, so that the smart appliance cloud server determines, based on the second signal fingerprint, the account to which the refrigerator belongs, to implement automatic binding between the refrigerator and the account to which the refrigerator belongs.

214: The smart appliance cloud server receives the second signal fingerprint and the corresponding device identifier of the refrigerator that are sent by the refrigerator, and determines a first account corresponding to the second signal fingerprint.

Specifically, when using the smart appliance cloud service, each user sends a first account of the user and a first signal fingerprint corresponding to the first account to the smart appliance cloud server, that is, the smart appliance cloud server stores at least one first account and a first signal fingerprint corresponding to each first account.

Based on this, the determining the first account corresponding to the second signal fingerprint includes: matching the second signal fingerprint with each first signal fingerprint stored in the smart appliance cloud server, and if the first signal fingerprint matches the second signal fingerprint, determining that the first account corresponding to the first signal fingerprint is the first account corresponding to the second signal fingerprint, that is, the second signal fingerprint corresponds to the first account corresponding to the first signal fingerprint.

A matching principle of signal fingerprints is as follows: calculating a similarity between the second signal fingerprint and each first signal fingerprint, determining a maximum similarity based on the similarity between the second signal fingerprint and each first signal fingerprint, determining whether the maximum similarity is greater than a preset similarity, and if the maximum similarity is greater than the preset similarity, matching a first signal fingerprint corresponding to the maximum similarity with the second signal fingerprint.

Specifically, a similarity between the second signal fingerprint and a first signal fingerprint may be calculated in the following two manners:

In a first manner, a union set of signals in the second signal fingerprint and the first signal fingerprint is determined based on identification information of each signal in the second signal fingerprint and identification information of each signal in the first signal fingerprint.

A difference between signal strength of each signal in the union set in the second signal fingerprint and signal strength of each signal in the first signal fingerprint is separately calculated, to obtain a signal strength difference of each signal. It should be noted that if a signal in the union set exists only in one of the second signal fingerprint and the first signal fingerprint, signal strength of the signal in a signal fingerprint in which the signal does not exist is set to 0.

A square of the signal strength difference of each signal in the union set is separately calculated, squares of signal strength differences of the signals in the union set are summed up, and a ratio of a summation result to a total quantity of the signals in the union set is determined as the similarity between the second signal fingerprint and the first signal fingerprint.

In a second manner, an intersection set between signals in the second signal fingerprint and the first signal fingerprint is determined based on identification information of each signal in the second signal fingerprint and identification information of each signal in the first signal fingerprint.

A difference between signal strength of each signal in the intersection in the second signal fingerprint and signal strength of each signal in the first signal fingerprint is separately calculated, to obtain a signal strength difference of each signal.

A square of the signal strength difference of each signal in the intersection set is separately calculated, squares of signal strength differences of the signals in the intersection set are summed up, and a ratio of a summation result to a total quantity of the signals in the intersection set is determined as the similarity between the second signal fingerprint and the first signal fingerprint.

It should be noted that the foregoing manner of calculating the similarity between the second signal fingerprint and the first signal fingerprint is merely an example, and is not intended to limit this application. A principle of calculating the similarity between the second signal fingerprint and each first signal fingerprint is the same. Therefore, a principle of calculating a similarity between the second signal fingerprint and each of other first signal fingerprints is not described herein again.

According to the foregoing matching manner, a similarity between the second signal fingerprint and the first signal fingerprint indicated in Table 1 is the greatest and is greater than the preset similarity. Therefore, the first account corresponding to the first signal fingerprint indicated in Table 1 is determined as the account to which the second signal fingerprint belongs, that is, the second signal fingerprint corresponds to the first account corresponding to the first signal fingerprint indicated in Table 1.

It should be noted that, when the first signal fingerprint and the second signal fingerprint further include another parameter, for example, at least one of a signal class, a signal timestamp, a change speed of signal strength, or other detectable signal-related public information, in addition to the identification information and the signal strength of the signal, a principle of calculating the similarity between the second signal fingerprint and the first signal fingerprint is the same as that described above. Details are not described herein again.

Before the first account corresponding to the second signal fingerprint is determined, whether the refrigerator is a device authenticated by the smart appliance cloud service may be further verified first. If the refrigerator is a device authenticated by the smart appliance cloud service, the first account corresponding to the second signal fingerprint is determined. If the refrigerator is not a device authenticated by the smart appliance cloud service, the first account corresponding to the second signal fingerprint is not determined.

Specifically, a process of verifying whether the refrigerator is a device authenticated by the smart appliance cloud service includes:

When the refrigerator is delivered from a factory, the smart appliance cloud server may authenticate a supplier qualification, protocol content, and the like of the refrigerator. After the authentication succeeds, the smart appliance cloud server stores the device identifier (for example, a serial number) and an initial key of the refrigerator, and the refrigerator stores the device identifier and the initial key of the refrigerator. Then, in step 213, the refrigerator sends the second signal fingerprint, and the device identifier and the initial key of the refrigerator to the smart appliance cloud server. The smart appliance cloud server receives the second signal fingerprint, and the device identifier and the initial key of the refrigerator; determines whether the received device identifier and initial key of the refrigerator are the same as the device identifier and the initial key of the refrigerator that are stored in the smart appliance cloud server; and if the received device identifier and initial key of the refrigerator are the same as the device identifier and the initial key of the refrigerator that are stored in the smart appliance cloud server, determines that the refrigerator is the device authenticated by the smart appliance cloud service, matches the second signal fingerprint with each first signal fingerprint stored in the smart appliance cloud server, and determines that a first account corresponding to the first signal fingerprint matching the second signal fingerprint is the first account corresponding to the second signal fingerprint.

It should be noted that, if any first signal fingerprint does not match the second signal fingerprint, response information indicating that the matching fails is sent to the mobile phone. After receiving the response information, the mobile phone prompts, in response to the response information, the user that the first signal fingerprint needs to be recollected. The user repeats the foregoing step of collecting the first signal fingerprint, and sends a recollected first signal fingerprint and a corresponding first account to the smart appliance cloud server, so as to determine, based on the recollected first signal fingerprint, the first account corresponding to the second signal fingerprint.

215: The smart appliance cloud server binds, based on a correspondence between the second signal fingerprint and the device identifier of the refrigerator, the refrigerator to the first account corresponding to the second signal fingerprint. That is, the first account corresponding to the second signal fingerprint is determined as the account to which the refrigerator belongs, and the refrigerator is bound to the first account. This implements binding between the refrigerator and the account to which the refrigerator belongs.

It can be learned from the foregoing that, the smart appliance cloud server matches the second signal fingerprint collected and generated by the refrigerator with the first signal fingerprint, to determine the first account corresponding to the second signal fingerprint, so as to determine, based on the correspondence between the second signal fingerprint and the device identifier of the refrigerator, that the first account corresponding to the second signal fingerprint is the account to which the refrigerator belongs, and bind the refrigerator to the first account corresponding to the second signal fingerprint. This implements binding between the refrigerator and the account to which the refrigerator belongs. In addition, the binding step is simple and easy to perform, and various complex configuration processes are not required, so that binding efficiency is high, binding time is short, and user experience is good.

It should be noted that, to further determine binding accuracy and improve user experience, before step 215, the smart appliance cloud server may further send, to the mobile phone, a query request about whether to perform binding. The mobile phone displays the query request. The user sends response information to the mobile phone based on the query request. The mobile phone sends the response information to the smart appliance cloud server. The smart appliance cloud server receives the response information. If the response information is acknowledgment information, step 215 is performed. If the response information is negative acknowledgment information, the binding between the refrigerator and the first account is abandoned.

After the refrigerator is bound to the first account, the smart appliance cloud server may further synchronize first configuration information to the mobile phone. The first configuration information includes the device identifier of the refrigerator, and the like. Therefore, after the user logs in to the smart appliance client in the mobile phone by using the first account and the login password, the smart appliance client in the mobile phone adds an operation control of the refrigerator to an interface of the smart appliance client based on the device identifier of the refrigerator in the first configuration information, so that the user controls the refrigerator based on the operation control.

To enable the refrigerator to identify the account to which the refrigerator belongs, that is, the first account, and when the user delivers a control instruction to the refrigerator by using the smart appliance cloud server, the refrigerator may determine, based on an account carried in the control instruction, whether the control instruction is a control instruction sent by the account to which the refrigerator belongs, to ensure security of refrigerator control, the smart appliance cloud server may send second configuration information to the refrigerator by using the home gateway. The second configuration information includes the first account. The refrigerator receives and stores the second configuration information. In this way, after receiving the control instruction, the refrigerator compares the account carried in the control instruction with the first account stored in the refrigerator. If the accounts are consistent, the control instruction is sent by the account to which the refrigerator belongs, and the refrigerator executes the control instruction. If the accounts are inconsistent, the control instruction is not sent by the account to which the refrigerator belongs, and the refrigerator does not execute the control instruction.

When a placement position of a home appliance of the user changes, or a deployment position of Wi-Fi, Bluetooth, or the like of the user changes, or a deployment position of Wi-Fi, Bluetooth, or the like of next door, upstairs, or downstairs changes, or a placement position of a home appliance of next door, upstairs, or downstairs changes, or a signal identifier of upstairs, next door, downstairs, or the home of the user is modified, signal strength and/or signal identifier information collected at a same collection position changes. Consequently, a first signal fingerprint corresponding to the same collection position changes. Therefore, to ensure accuracy and effectiveness of the first signal fingerprint corresponding to the collection position, the refrigerator may further collect a signal at the set position, generate a third signal fingerprint, and send the third signal fingerprint to the smart appliance cloud server by using the home gateway. The smart appliance cloud server receives the third signal fingerprint, and updates the first signal fingerprint (that is, the first signal fingerprint matching the second signal fingerprint) by using the third signal fingerprint. It should be noted that a principle of generating the third signal fingerprint is the same as that of generating the second signal fingerprint. Therefore, details are not described herein again. A frequency or an occasion at which the refrigerator collects the signal at the set location and generates the third signal fingerprint may be set according to an application scenario, and is not specially limited herein.

To quickly perform device configuration on the refrigerator, the smart appliance cloud server sends third configuration information to the refrigerator by using the home gateway. The third configuration information is used to indicate device configuration information of the refrigerator. After receiving the third configuration information, the refrigerator performs device configuration based on the third configuration information, so that the refrigerator runs based on content configured by using the third configuration information. It should be noted that the third configuration information may include configuration information, for example, an access interface, an information reporting frequency, a data format, and a used protocol, required by the refrigerator in a proper running process.

There may be more than one person living in a family, or there may be more than one person working in an office area. Therefore, to facilitate an associated user of the user (that is, a family member or a colleague of the user) to operate the refrigerator, the user may further send an associated account (that is, a second account) of the first account to the smart appliance cloud server in advance by using the mobile phone. The smart appliance cloud server receives the second account. Based on this, after binding the first account to the refrigerator, the smart appliance cloud server binds the refrigerator to the second account.

On this basis, after the associated user logs in, by using the second account, to the smart appliance client on a user terminal (for example, a mobile phone, a computer, or a tablet computer) used by the associated user, the smart appliance cloud server sends the first configuration information to the user terminal of the associated user. The first configuration information includes the device identifier of the refrigerator. The user terminal of the associated user receives the first configuration information, and adds the operation control of the refrigerator on the interface of the smart appliance client based on the device identifier of the refrigerator in the first configuration information, so that the associated user can control the refrigerator based on the operation control.

To enable the refrigerator to identify the associated account (that is, the second account) of the account to which the refrigerator belongs, and when the associated user delivers a control instruction to the refrigerator by using the smart appliance cloud server, the refrigerator may determine, based on an account carried in the control instruction, whether the control instruction is a control instruction sent by the second account, to ensure security of refrigerator control, the smart appliance cloud server sends the second account to the refrigerator. The refrigerator receives and stores the second account, to determine, after receiving the control instruction, based on a result of matching between the account carried in the control instruction and the second account, whether the control instruction is a control instruction sent by the second account.

To control operation permission of a user corresponding to the first account and operation permission of a user corresponding to the second account on the refrigerator, the user sends fourth configuration information to the smart appliance cloud server by using the mobile phone. The fourth configuration information includes the operation permission of the first account on the refrigerator and the operation permission of the second account on the refrigerator. For example, the first account has read/write permission on the refrigerator, and the second account has read permission on the refrigerator. The smart appliance cloud server receives the fourth configuration information sent by the mobile phone. Based on this, when the user sends the control instruction for the refrigerator to the smart appliance cloud server, the smart appliance cloud server may determine, based on the fourth configuration information and the account and instruction information carried in the control instruction, whether the user has permission to send the control instruction to the refrigerator, and if the user has permission to send the control instruction to the refrigerator, send the control instruction to the refrigerator, or if the user does not have permission to send the control instruction to the refrigerator, return, to the user, prompt information indicating that the operation exceeds the limit.

On this basis, after binding the refrigerator to the first account, the smart appliance cloud server may send the fourth configuration information to the refrigerator by using the home gateway. The refrigerator receives the fourth configuration information, and configures permission configuration information of the refrigerator based on the fourth configuration information. In this way, after receiving the control instruction, the refrigerator determines, based on the account and instruction information carried in the control instruction and the permission information in the fourth configuration information, whether to execute the instruction.

It should be noted that the associated user may also collect the first signal fingerprint by using the user terminal, and send the first signal fingerprint and the corresponding second account to the smart appliance cloud server. After receiving the first signal fingerprint and the corresponding second account that are sent by the user terminal of the associated user, the smart appliance cloud server stores the first signal fingerprint corresponding to the second account and the first signal fingerprint corresponding to the first account together, that is, stores first signal fingerprints collected by the user and the associated user together. In this way, a quantity of first signal fingerprints is increased, the first signal fingerprint is enriched, so that a result of matching between the second signal fingerprint and the first signal fingerprint is more accurate.

To implement automatic connection between the refrigerator and the network, the user may further send, to the smart appliance cloud server by using the mobile phone, network configuration information corresponding to the first account, and the smart appliance cloud server receives the network configuration information corresponding to the first account. In this way, after binding the refrigerator to the first account, the smart appliance cloud server sends, to the refrigerator by using the home gateway, the network configuration information corresponding to the first account, so that the refrigerator accesses the network based on the network configuration information corresponding to the first account. For example, if the network configuration information corresponding to the first account is an account and a password of a router, the refrigerator is connected to the router based on the account and the password of the router, and is further connected to the network, so that the smart appliance cloud server can directly interact with the refrigerator by using the network instead of interacting with the refrigerator by using the restricted network of the home gateway.

It should be noted that, in another embodiment of this application, when the refrigerator is not connected to the network, various configuration information delivered by the smart appliance cloud server to the refrigerator, various information sent by the refrigerator to the smart appliance cloud server, and the like may be further forwarded by using the virtual SIM card, that is, information exchange between the smart appliance cloud server and the refrigerator is implemented by using the virtual SIM card. When the refrigerator is connected to the network, information exchange between the smart appliance cloud server and the refrigerator is implemented by using the network without the central device and the virtual SIM card.

Figure 3:
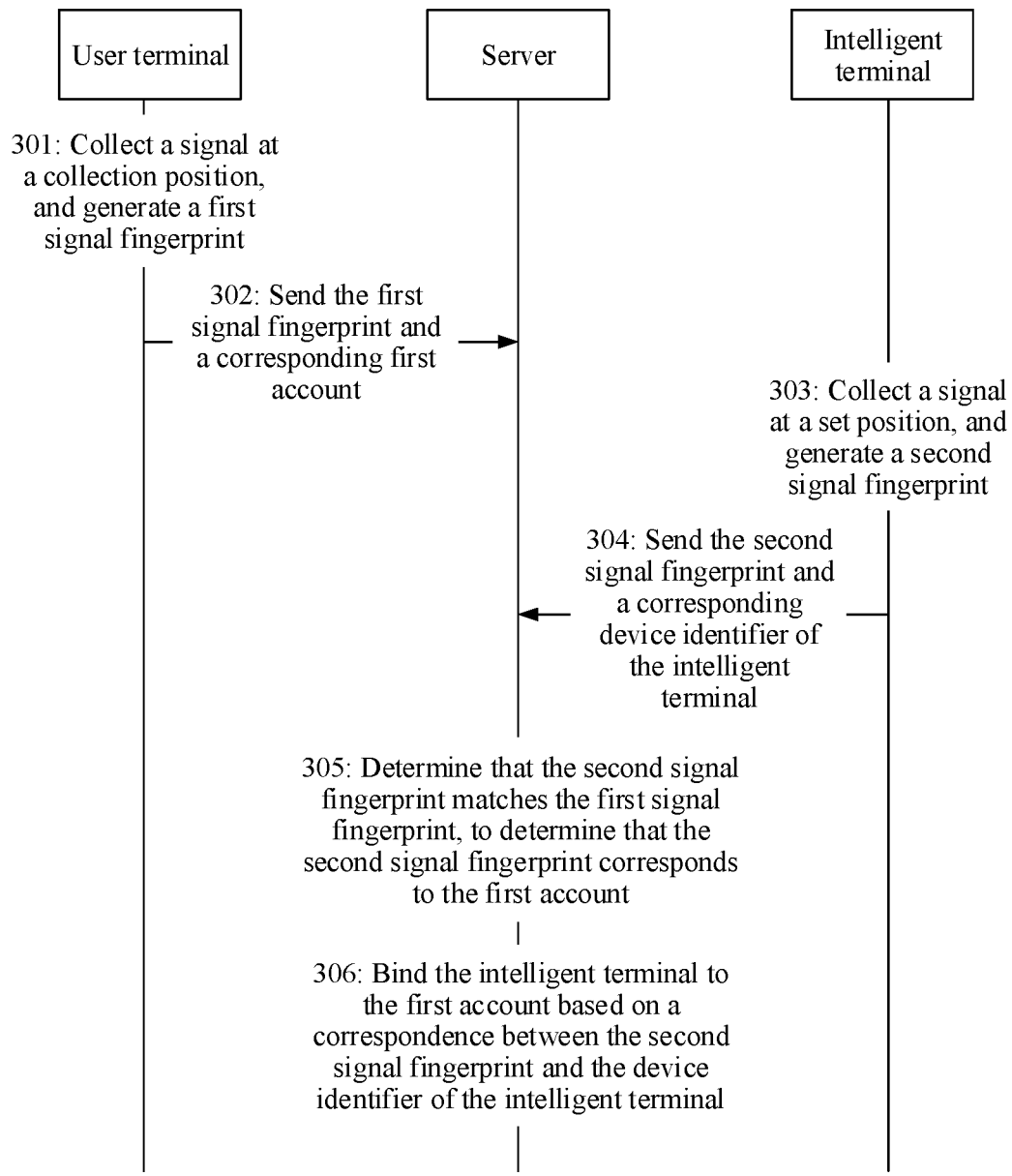
FIG. 3 is a schematic flowchart 1 of a device binding method according to an embodiment of this application.

Based on the refrigerator binding method shown in FIG. 2A and FIG. 2B, this application provides a device binding method. FIG. 3 is a schematic flowchart 1 of a device binding method according to an embodiment of this application. As shown in FIG. 3, the device binding method includes the following steps:

301: A user terminal collects a signal at a collection position, and generates a first signal fingerprint.

302: The user terminal sends the first signal fingerprint and a corresponding first account to a server.

303: An intelligent terminal collects a signal at a set position, and generates a second signal fingerprint.

Because a principle of generating the first signal fingerprint and the second signal fingerprint has been described above, details are not described herein again.

304: The intelligent terminal sends the second signal fingerprint and a corresponding device identifier of the intelligent terminal to the server.

Specific implementation includes the following two manners:

Manner 1: The intelligent terminal sends the second signal fingerprint and the corresponding device identifier of the intelligent terminal to the server by using a central device.

Manner 2: The intelligent terminal sends the second signal fingerprint and the corresponding device identifier of the intelligent terminal to the server by using a virtual SIM card.

305: The server determines that the second signal fingerprint matches the first signal fingerprint, to determine that the second signal fingerprint is corresponding to the first account. That is, the server matches the second signal fingerprint with each first signal fingerprint; and if the first signal fingerprint matches the second signal fingerprint, determines that the first account corresponding to the first signal fingerprint is the first account corresponding to the second signal fingerprint, that is, the second signal fingerprint corresponds to the first account corresponding to the first signal fingerprint. Because a specific matching process of signal fingerprints has been described above, details are not described herein again.

306: The server binds the intelligent terminal to the first account based on a correspondence between the second signal fingerprint and the device identifier of the intelligent terminal. That is, the first account is determined as an account to which the intelligent terminal belongs, and the intelligent terminal is bound to the first account. This implements binding between the intelligent terminal and the account to which the intelligent terminal belongs.

In conclusion, the user terminal collects the signal at the collection position, generates the first signal fingerprint, and sends the first signal fingerprint and the corresponding first account to the server. The intelligent terminal collects the signal at the set position, generates the second signal fingerprint, and sends the second signal fingerprint and the corresponding device identifier of the intelligent terminal to the server. After determining that the second signal fingerprint matches the first signal fingerprint, the server determines that the second signal fingerprint is corresponding to the first account, to bind the intelligent terminal to the first account based on the correspondence between the second signal fingerprint and the device identifier of the intelligent terminal, so that the intelligent terminal is bound to the account to which the intelligent terminal belongs. Compared with the conventional technology, in this manner, various complex configuration processes are not required, so that binding efficiency is improved, binding time is shortened, and user experience is improved. In addition, the account to which the intelligent terminal belongs can be determined only through matching of signal fingerprints, so as to implement binding between the intelligent terminal and the account to which the intelligent terminal belongs. A binding step is simple and easy to perform.

In addition, in a related technology, a device binding method is provided. An implementation process of the device binding method is as follows:

A user registers an account on a platform, and purchases an intelligent terminal by using the account. When purchasing the intelligent terminal, a server binds the account to the purchased intelligent terminal. In this way, after the intelligent terminal is purchased home and powered on, the server determines, based on a binding relationship between the account and the intelligent terminal when the intelligent terminal is purchased, the account for purchasing the intelligent terminal as an account to which the intelligent terminal belongs, and binds the account for purchasing the intelligent terminal to the intelligent terminal, so that the user controls the intelligent terminal by using the account for purchasing the intelligent terminal. Based on this, if the user purchases an intelligent terminal for the parent by using the account of the user, according to the foregoing device binding principle, the intelligent terminal purchased by the user is bound to the account of the user for purchasing the intelligent terminal. That is, the intelligent terminal is bound to the account of the user, but cannot be bound to an account of the parent of the user. As a result, a binding error occurs, and the parent of the user cannot control the intelligent terminal by using the account of the parent.

However, in the device binding method provided in this embodiment of this application, because determining of the account (that is, the first account) to which the intelligent terminal belongs is related to the second signal fingerprint corresponding to the set position of the intelligent terminal and the first signal fingerprint corresponding to the collection position, and is irrelevant to an account for purchasing the intelligent terminal, accurate binding of the intelligent terminal can be implemented.

In this embodiment of this application, after binding the intelligent terminal to the first account, the server may further send first configuration information to the user terminal. The first configuration information includes the device identifier of the intelligent terminal and the like, so that an operation control of the intelligent terminal is added to the user terminal based on the device identifier of the intelligent terminal in the first configuration information, and the user controls the intelligent terminal based on the operation control.

To enable the intelligent terminal to identify the account to which the intelligent terminal belongs, that is, the first account, and when the user delivers a control instruction to the intelligent terminal by using the server, the intelligent terminal may determine, based on an account carried in the control instruction, whether the control instruction is a control instruction sent by the account to which the intelligent terminal belongs, to ensure security of intelligent terminal control, the server may send second configuration information to the intelligent terminal. The second configuration information includes the first account. The intelligent terminal receives and stores the second configuration information. In this way, after receiving the control instruction, the intelligent terminal compares the account carried in the control instruction with the first account stored in the intelligent terminal. If the accounts are consistent, the control instruction is sent by the account to which the intelligent terminal belongs, and the intelligent terminal executes the control instruction. If the accounts are inconsistent, the control instruction is not sent by the account to which the intelligent terminal belongs, and the intelligent terminal does not execute the control instruction.

When a placement position of a home appliance of the user changes, or a deployment position of Wi-Fi, Bluetooth, or the like of the user changes, or a deployment position of Wi-Fi, Bluetooth, or the like of next door, upstairs, or downstairs changes, or a placement position of a home appliance of next door, upstairs, or downstairs changes, or a signal identifier of upstairs, next door, downstairs, or the home of the user is modified, signal strength and/or signal identifier information of a signal collected at a same collection position changes. Consequently, a first signal fingerprint corresponding to the same collection position changes. Therefore, to ensure accuracy and effectiveness of the first signal fingerprint corresponding to the collection position, the intelligent terminal may further collect a signal at the set position, generate a third signal fingerprint, and send the third signal fingerprint to the server. The server receives the third signal fingerprint, and updates the first signal fingerprint (that is, the first signal fingerprint matching the second signal fingerprint) by using the third signal fingerprint.

To quickly implement device configuration of the intelligent terminal, the server sends third configuration information to the intelligent terminal. The third configuration information is used to indicate device configuration information of the intelligent terminal. After receiving the third configuration information, the intelligent terminal performs device configuration based on the third configuration information, so that the intelligent terminal runs based on content configured by using the third configuration information. It should be noted that the third configuration information may include configuration information, for example, an access interface, an information reporting frequency, a data format, and a used protocol, required by the intelligent terminal in a proper running process.

There may be more than one person living in a family, or there may be more than one person working in an office area. Therefore, to facilitate an associated user of the user (that is, a family member or a colleague of the user) to operate the intelligent terminal, the user may further send an associated account (that is, a second account) of the first account to the server in advance by using the user terminal. The server receives the second account. In this way, after binding the first account to the intelligent terminal, the server binds the intelligent terminal to the second account.

On this basis, the server sends the first configuration information to the user terminal being used by the associated user. The first configuration information includes the device identifier of the intelligent terminal. The user terminal being used by the associated user receives the first configuration information, and adds the operation control of the intelligent terminal based on the device identifier of the intelligent terminal in the first configuration information, so that the associated user can control the intelligent terminal based on the operation control.

To enable the intelligent terminal to identify the associated account (that is, the second account) of the account to which the intelligent terminal belongs, and when the associated user delivers the control instruction to the intelligent terminal by using the server, the intelligent terminal may determine, based on the account carried in the control instruction, whether the control instruction is the control instruction sent by the second account, so as to ensure control security of the intelligent terminal, the server sends the second account to the intelligent terminal. The intelligent terminal receives and stores the second account.

To control operation permission of a user corresponding to the first account and operation permission of a user corresponding to the second account on the intelligent terminal, the user sends fourth configuration information to the server by using the user terminal. The fourth configuration information includes the operation permission of the first account on the intelligent terminal and the operation permission of the second account on the intelligent terminal. Based on this, when the user sends the control instruction for the intelligent terminal to the server, the server may determine, based on the fourth configuration information and the account and instruction information carried in the control instruction, whether the user has permission to send the instruction to the intelligent terminal, and if the user has permission to send the instruction to the intelligent terminal, send the control instruction to the intelligent terminal, or if the user does not have permission to send the instruction to the intelligent terminal, return, to the user, prompt information indicating that the operation exceeds the limit.

On this basis, after binding the intelligent terminal to the first account, the server may send the fourth configuration information to the intelligent terminal. The intelligent terminal receives the fourth configuration information, and configures permission configuration information of the intelligent terminal based on the fourth configuration information. In this way, after receiving the control instruction of the user for the intelligent terminal, the intelligent terminal determines, based on the account and the instruction information carried in the instruction, whether to execute the instruction.

To implement automatic connection between the intelligent terminal and the network, the user may further send, to the server by using the user terminal, network configuration information corresponding to the first account, and the server receives the network configuration information corresponding to the first account. In this way, after binding the intelligent terminal to the first account, the server sends, to the intelligent terminal, the network configuration information corresponding to the first account, so that the intelligent terminal accesses the network based on the network configuration information corresponding to the first account.

Figure 4A:
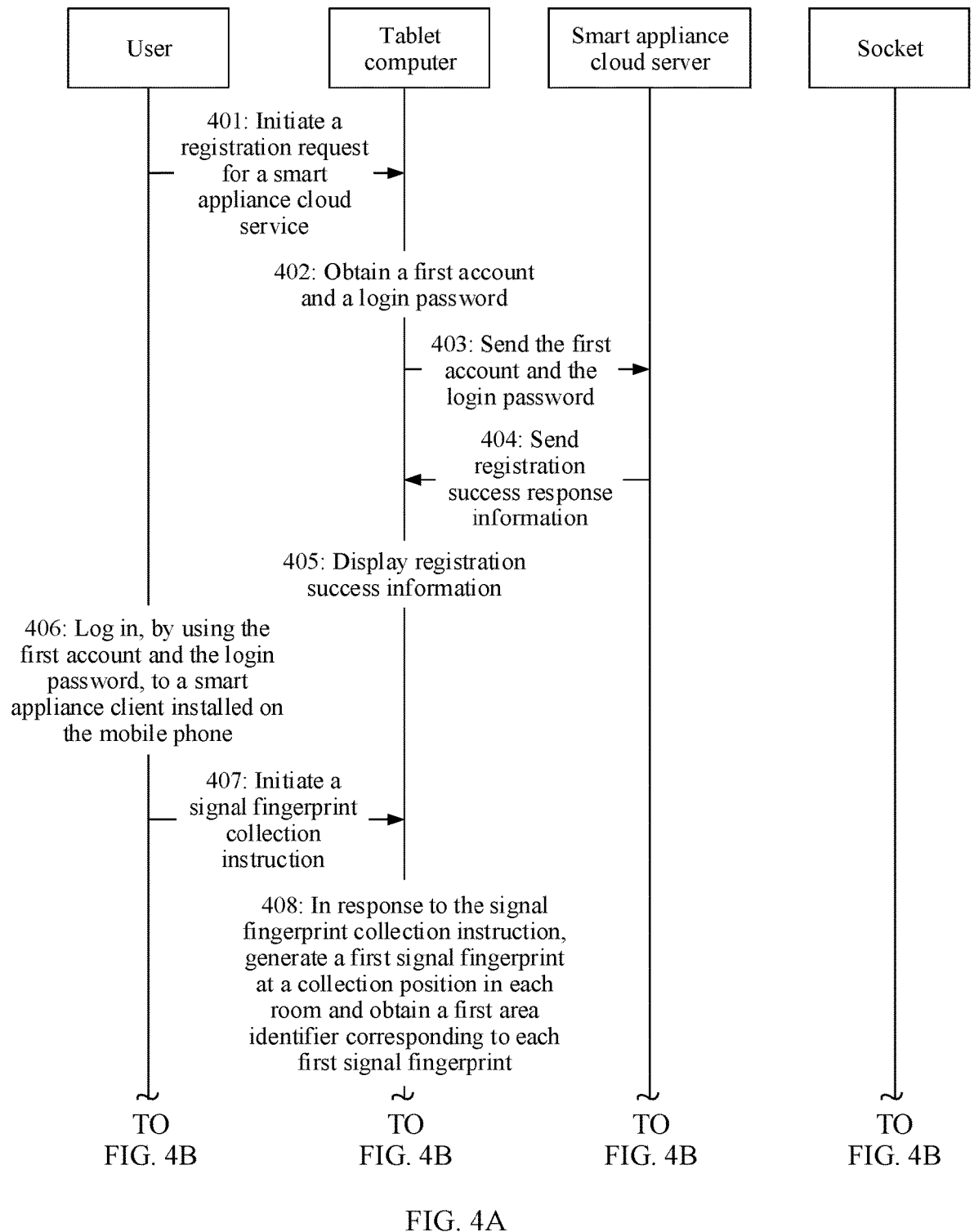
FIG. 4A and FIG. 4B are a schematic flowchart of a socket binding method according to an embodiment of this application.
Figure 4B:
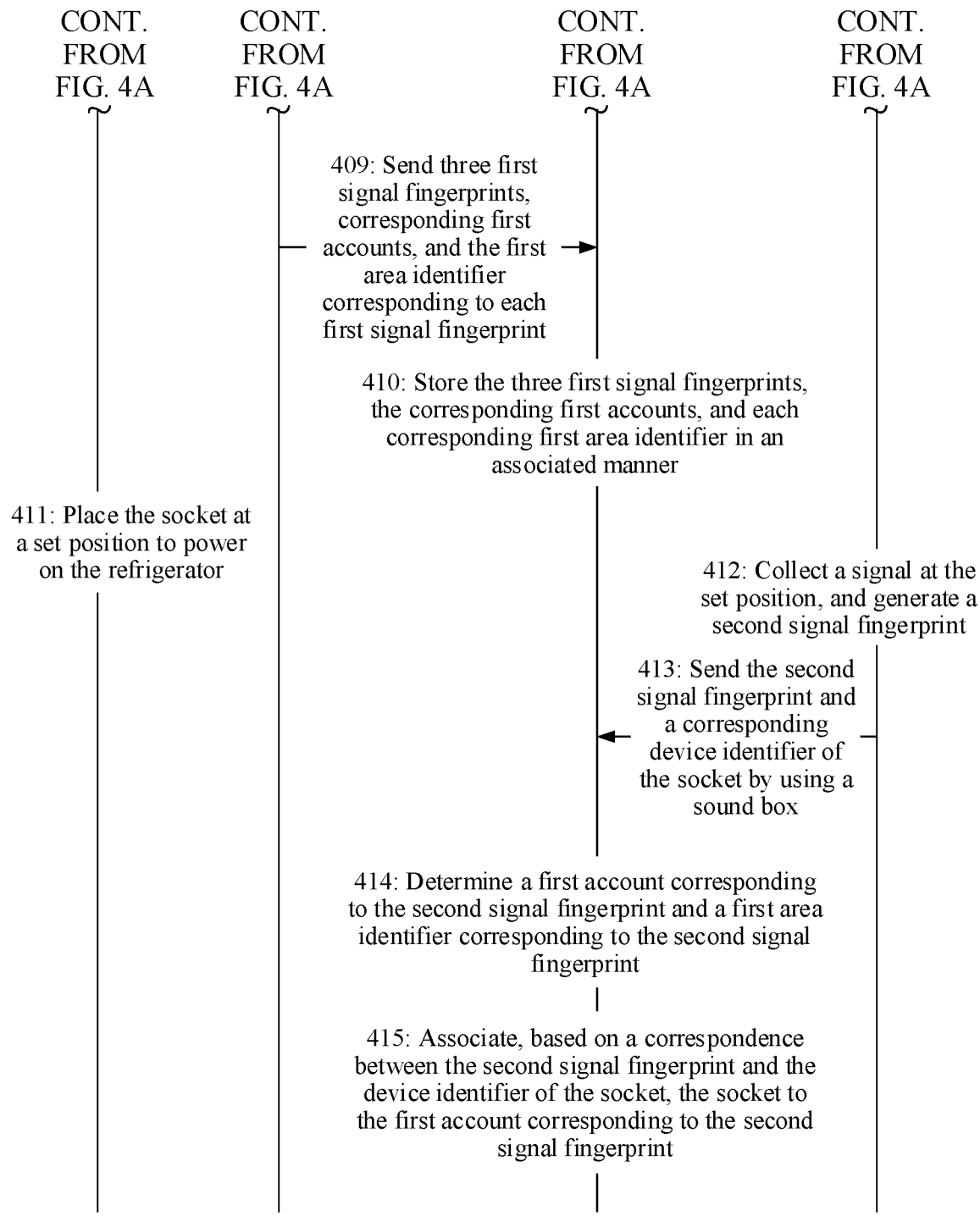

FIG. 4A and FIG. 4B are a schematic flowchart of a socket binding method according to an embodiment of this application. In FIG. 4A and FIG. 4B, an intelligent terminal set by a user is a socket, the socket is one of the at least one intelligent terminal in FIG. 1, a user terminal used by the user is a tablet computer, the tablet computer is one of the at least one user terminal in FIG. 1, a central device is a sound box, the sound box is one of the at least one central device in FIG. 1, a server is a smart appliance cloud server, the user disposes the socket in a house of the user, and the house has two bedrooms and one living room. Based on this, the socket binding method may include the following steps:

401: The user initiates a registration request for a smart appliance cloud service to the tablet computer.

Specifically, the user may initiate the registration request for the smart appliance cloud service to the tablet computer by starting a smart appliance client installed on the tablet computer and tapping a registration control on a display interface of the smart appliance client.

402: The tablet computer receives the registration request and obtains a first account and a login password in response to the registration request, where the first account is an account used by the user to log in to the smart appliance client.

Specifically, the tablet computer receives and responds to the registration request, so that the smart appliance client provides an account registration interface on the display interface. The user may enter the first account and the login password on the account registration interface, so that the tablet computer obtains the first account and the login password.

403: The tablet computer sends the first account and the login password to the smart appliance cloud server.

404: The smart appliance cloud server receives the first account and the login password, determines whether an account that is the same as the first account exists in accounts stored in the smart appliance cloud server, and if the account does not exist, sends registration success response information to the tablet computer.

405: The tablet computer receives the registration success response information, and displays registration success information, to notify the user that the account is successfully registered, and the user can log in to the smart appliance client by using the first account and the login password.

It should be noted that, if the smart appliance cloud server stores the account that is the same as the first account, an indication for re-obtaining the first account and the login password needs to be sent to the tablet computer until registration succeeds.

406: The user logs in, by using the first account and the login password, to the smart appliance client installed on the tablet computer.

407: The user walks in different rooms in the house while holding the tablet computer, and initiates a signal fingerprint collection instruction to the tablet computer each time the user walks to a collection position in a room.

408: The tablet computer receives and responds to the signal fingerprint collection instruction, collects a signal at a collection position in each room, generates a first signal fingerprint at the collection position in each room based on the signal collected at the collection position in each room, and obtains a first area identifier corresponding to each first signal fingerprint, where a quantity of first signal fingerprints is the same as a quantity of collection positions, one collection position corresponds to one first signal fingerprint, and the first area identifier corresponding to the first signal fingerprint is an identifier of an area to which the collection position corresponding to the first signal fingerprint belongs.

A process of collecting a signal at a collection position and generating a first signal fingerprint at the collection position includes: first driving a signal collection program, detecting a signal at the collection position, collecting identification information and signal strength of each detected signal, and packaging identification information and signal strength of all detected signals to obtain the first signal fingerprint at the collection position.

A manner of obtaining the first area identifier corresponding to the first signal fingerprint is: obtaining the first area identifier corresponding to the first signal fingerprint by querying the user. For example, when the user moves to a collection position, the tablet computer initiates a query request to the user to query an identifier of an area to which the collection position belongs, obtains, based on an answer of the user, the identifier of the area to which the collection position belongs, and sets the identifier of the area to which the collection position belongs to the first area identifier corresponding to the first signal fingerprint at the collection position.

Because the user disposes the socket in the house of the user, and the house of the user has two bedrooms and one living room, one collection position may be selected in each of the living room and the two bedrooms. In this way, three collection positions and three first signal fingerprints are obtained. The three collection positions are in a one-to-one correspondence with the three first signal fingerprints. The three collection positions are respectively a first collection position to a third collection position, the first collection position is in the living room, the second collection position is in a first room, and the third collection position is in a second room.

The first signal fingerprint at the first collection position is shown in Table 5. In Table 5, the first signal fingerprint at the first collection position includes five signals, and all the five signals are Wi-Fi signals. Identification information SSID of each Wi-Fi signal and signal strength RSSI of each Wi-Fi signal are shown in Table 5, and a first area identifier corresponding to the first signal fingerprint in Table 5 is the living room.

TABLE 5

| SSID | RSSI |
|---|---|
| AP 1 | 20 |
| AP 2 | 100 |
| AP 3 | 78 |
| AP 4 | 63 |
| AP 5 | 59 |

The first signal fingerprint at the second collection position is shown in Table 6. In Table 6, the first signal fingerprint at the second collection position includes five signals, and all the five signals are Wi-Fi signals. Identification information SSID of each Wi-Fi signal and signal strength RSSI of each Wi-Fi signal are shown in Table 6, and a first area identifier corresponding to the first signal fingerprint in Table 6 is the first room.

TABLE 6

| SSID | RSSI |
| --- | --- |
| AP 1 | 50 |
| AP 2 | 89 |
| AP 3 | 128 |
| AP 4 | 89 |
| AP 5 | 30 |

The first signal fingerprint at the third collection position is shown in Table 7. In Table 7, the first signal fingerprint at the third collection position includes five signals, and all the five signals are Wi-Fi signals. Identification information SSID of each Wi-Fi signal and signal strength RSSI of each Wi-Fi signal are shown in Table 7, and a first area identifier corresponding to the first signal fingerprint in Table 7 is the second room.

TABLE 7

| SSID | RSSI |
| --- | --- |
| AP 1 | 30 |
| AP 2 | 139 |
| AP 3 | 78 |
| AP 4 | 28 |
| AP 5 | 97 |

It should be noted that, in another embodiment of this application, in a process of generating a first signal fingerprint at a collection position, when identification information and signal strength of each detected signal are collected, at least one of a signal class, a signal timestamp, a change speed of the signal strength, other detectable signal-related public information, and the like of each detected signal may be further collected. The signal class includes a Wi-Fi signal, a Bluetooth signal, a UWB signal, and the like. When the identification information and the signal strength of all the detected signals are packed, at least one of signal classes, signal timestamps, change speeds of the signal strength, other detectable signal-related public information, and the like of all the detected signals also need to be packed, to obtain the first signal fingerprint at the collection position.

409: After generating the first signal fingerprint corresponding to each collection position, the tablet computer sends the foregoing three first signal fingerprints, first accounts corresponding to the three first signal fingerprints, and the first area identifier corresponding to each first signal fingerprint to the smart appliance cloud server.

410: The smart appliance cloud server receives the three first signal fingerprints, the first accounts corresponding to the three first signal fingerprints, and the first area identifier corresponding to each first signal fingerprint that are sent by the tablet computer, and stores the three first signal fingerprints, the corresponding first accounts, and the corresponding first area identifier in an associated manner.

It can be learned from the foregoing that, the signal is collected at the collection position, the first signal fingerprint is generated, and the first signal fingerprint, the corresponding first account, and the first area identifier corresponding to the first signal fingerprint are sent to the smart appliance cloud server, to provide a data basis for the smart appliance cloud server to determine an account to which the socket belongs.

411: After purchasing the socket, the user disposes the socket at a set position (for example, a position in the first room) to power on the socket.

412: After being powered on, the socket collects a signal at the set position, and generates a second signal fingerprint. That is, the socket starts a signal collection program, detects a signal at the set position, collects identification information and signal strength of each detected signal, and packs identification information and signal strength of all detected signals to obtain the second signal fingerprint.

The second signal fingerprint is shown in Table 8. In Table 8, the second signal fingerprint includes five signals, and all the five signals are Wi-Fi signals. Identification information SSID of each Wi-Fi signal and signal strength RSSI of each Wi-Fi signal are shown in Table 8.

TABLE 8

| SSID | RSSI |
| --- | --- |
| AP 1 | 53 |
| AP 2 | 83 |
| AP 3 | 132 |
| AP 4 | 80 |
| AP 5 | 37 |

It should be noted that, in another embodiment of this application, in a process of generating a second signal fingerprint, when identification information and signal strength of each detected signal are collected, at least one of a signal class, a signal timestamp, a change speed of the signal strength, other detectable signal-related public information, and the like of each detected signal may be further collected. The signal class includes a Wi-Fi signal, a Bluetooth signal, a UWB signal, and the like. When the identification information and the signal strength of all the detected signals are packed, at least one of signal classes, signal timestamps, change speeds of the signal strength, other detectable signal-related public information, and the like of all the detected signals also need to be packed, to obtain the second signal fingerprint.

413: The socket sends the second signal fingerprint and a corresponding device identifier of the socket to the smart appliance cloud server by using the sound box, where the sound box is in a network connected state.

Specifically, the socket is connected to the sound box by using a configured access information of a restricted network, and sends the second signal fingerprint and the corresponding device identifier of the socket to the sound box. The sound box receives the second signal fingerprint and the corresponding identification information of the socket, and sends the second signal fingerprint and the corresponding device identifier of the socket to the smart appliance cloud server.

Because the sound box is a central device selected by the socket from central devices that can be detected by the socket, the sound box may be a sound box set by the user, or may be a sound box set by a neighbor of the user. Based on this, before the socket sends the second signal fingerprint and the corresponding device identifier of the socket by using the sound box, the socket needs to select a central device (that is, the sound box) from the central devices that can be detected by the socket, and then the socket sends the second signal fingerprint and the corresponding device identifier of the socket by using the selected central device (that is, the sound box).

It should be noted that, in another embodiment of this application, the socket may further send the second signal fingerprint and the corresponding device identifier of the socket to the smart appliance cloud server by using a virtual SIM card. That is, when the socket is delivered from a factory, a virtual SIM card is disposed in the socket, and the socket is connected to a network by using the virtual SIM card, so that the second signal fingerprint and the device identifier of the socket are sent to the smart appliance cloud server by using the virtual SIM card.

It can be learned from the foregoing that, the socket collects the signal at the set position, generates the second signal fingerprint, and sends the second signal fingerprint and the corresponding device identifier of the socket to the smart appliance cloud server, so that the smart appliance cloud server determines, based on the second signal fingerprint, the account to which the socket belongs, to implement automatic binding between the socket and the account to which the socket belongs.

414: The smart appliance cloud server receives the second signal fingerprint and the corresponding device identifier of the socket that are sent by the socket, and determines a first account corresponding to the second signal fingerprint and a first area identifier corresponding to the second signal fingerprint.

Specifically, when using the smart appliance cloud service, each user sends a first account of the user, a first signal fingerprint corresponding to the first account, and a first area identifier corresponding to the first signal fingerprint to the smart appliance cloud server, that is, the smart appliance cloud server stores at least one first account, a first signal fingerprint corresponding to each first account, and a first area identifier corresponding to each first signal fingerprint.

Based on this, a process of determining the first account and the first area identifier that correspond to the second signal fingerprint includes: matching the second signal fingerprint with each first signal fingerprint stored in the smart appliance cloud server, if one first signal fingerprint matches the second signal fingerprint, determining that the first account corresponding to the first signal fingerprint is the first account corresponding to the second signal fingerprint, that is, the second signal fingerprint corresponds to the first account corresponding to the first signal fingerprint, and determining that the first area identifier corresponding to the first signal fingerprint is the first area identifier corresponding to the second signal fingerprint, that is, the second signal fingerprint corresponds to the first area identifier corresponding to the first signal fingerprint.

A matching principle of signal fingerprints is as follows:

calculating a similarity between the second signal fingerprint and each first signal fingerprint, determining a maximum similarity based on the similarity between the second signal fingerprint and each first signal fingerprint, determining whether the maximum similarity is greater than a preset similarity, and if the maximum similarity is greater than the preset similarity, matching a first signal fingerprint corresponding to the maximum similarity with the second signal fingerprint.

Because a principle of calculating a similarity between the second signal fingerprint and one first signal fingerprint has been described above, details are not described herein again.

According to the foregoing matching manner, a similarity between the second signal fingerprint and the first signal fingerprint indicated in Table 6 is the greatest and is greater than the preset similarity. Therefore, the first account corresponding to the first signal fingerprint indicated in Table 6 is determined as the account to which the second signal fingerprint belongs. That is, the second signal fingerprint corresponds to the first account corresponding to the first signal fingerprint indicated in Table 6. The first area identifier (that is, the first room) corresponding to the first signal fingerprint indicated in Table 6 is determined as the first area identifier corresponding to the second signal fingerprint.

It should be noted that, before the first account and the first area identifier that correspond to the second signal fingerprint are determined, whether the socket is a device authenticated by the smart appliance cloud service may be further verified first. If the socket is a device authenticated by the smart appliance cloud service, the first account and the first area identifier that correspond to the socket are determined; or if the socket is not a device authenticated by the smart appliance cloud service, the first account and the first area identifier that correspond to the socket are not determined.

Specifically, a principle of verifying whether the socket is the device authenticated by the smart appliance cloud service is the same as the foregoing principle of verifying whether the refrigerator is the device authenticated by the smart appliance cloud service. Therefore, this is not specifically limited herein.

415: The smart appliance cloud server binds, based on a correspondence between the second signal fingerprint and the device identifier of the socket, the socket to the first account corresponding to the second signal fingerprint, and marks the socket by using the first area identifier (the first room) corresponding to the second signal fingerprint. That is, the first account corresponding to the second signal fingerprint is determined as the account to which the socket belongs, and the socket is bound to the first account. This implements binding between the socket and the account to which the socket belongs. The first area identifier corresponding to the second signal fingerprint is determined as the first area identifier corresponding to the socket. This implements determining of an area to which a set position of the socket belongs.

It can be learned from the foregoing that, the smart appliance cloud server matches the second signal fingerprint collected and generated by the socket with the first signal fingerprint, to determine the first account and the first area identifier that correspond to the second signal fingerprint, so as to determine, based on the correspondence between the second signal fingerprint and the device identifier of the socket, that the first account corresponding to the second signal fingerprint is the account to which the socket belongs, determine that an area indicated by the first area identifier corresponding to the second signal fingerprint is the area to which the set position of the socket belongs, bind the socket to the first account corresponding to the second signal fingerprint, and mark the socket by using the first area identifier corresponding to the second signal fingerprint. This implements binding between the socket and the account to which the socket belongs and determining of the area to which the set position of the socket belongs. In addition, binding and area determining steps are simple and easy to perform, and various complex configuration processes are not required, so that binding and area determining efficiency is high, binding and area determining time is short, and user experience is good.

It should be noted that, to further determine binding accuracy and improve user experience, before step 415, the smart appliance cloud server may further send, to the tablet computer, a query request about whether to perform binding. The tablet computer displays the query request. The user sends response information to the tablet computer based on the query request. The tablet computer sends the response information to the smart appliance cloud server. The smart appliance cloud server receives the response information. If the response information is acknowledgment information, step 415 is performed. If the response information is negative acknowledgment information, the binding between the socket and the first account and the determining of the area to which the set position of the socket belongs are abandoned.

After the socket is bound to the first account, the smart appliance cloud server may further synchronize first configuration information to the tablet computer. The first configuration information includes the device identifier and the first area identifier of the socket, and the like. Therefore, after the user logs in to the smart appliance client in the tablet computer by using the first account and the login password, the smart appliance client in the tablet computer adds an operation control of the socket to an interface of the smart appliance client based on the device identifier and the first area identifier of the socket in the first configuration information, so that the user controls, based on the operation control, the socket located in the area indicated by the first area identifier.

To enable the socket to identify the account to which the socket belongs and the area to which the set position belongs, that is, the first account and the area indicated by the first area identifier, and when the user delivers a control instruction to the socket by using the smart appliance cloud server, the socket may determine, based on an account and an area identifier that are carried in the control instruction, whether the control instruction is a control instruction that is sent by the account to which the socket belongs to the socket located in the area indicated by the first area identifier, to ensure security of socket control, the smart appliance cloud server may send second configuration information to the socket by using the sound box. The second configuration information includes the first account and the first area identifier. The socket receives and stores the second configuration information. In this way, after receiving the control instruction, the socket compares the account carried in the control instruction with the first account stored in the socket, and compares the area identifier carried in the control instruction with the first area identifier stored in the socket. If the accounts and area identifiers are consistent, the control instruction is sent by the account to which the socket belongs to the socket located in the area indicated by the first area identifier, and the socket executes the control instruction. If the accounts and area identifiers are inconsistent, the control instruction is not sent by the account to which the socket belongs to the socket located in the area indicated by the first area identifier, and the socket does not execute the control instruction.

When a placement position of a home appliance of the user changes, or a deployment position of Wi-Fi, Bluetooth, or the like of the user changes, or a deployment position of Wi-Fi, Bluetooth, or the like of next door, upstairs, or downstairs changes, or a placement position of a home appliance of next door, upstairs, or downstairs changes, or a signal identifier of upstairs, next door, downstairs, or the home of the user is modified, signal strength and/or signal identifier information collected at a same collection position changes. Consequently, a first signal fingerprint corresponding to the same collection position changes. Therefore, to ensure accuracy and effectiveness of the first signal fingerprint corresponding to the collection position, the socket may further collect a signal at the set position, generate a third signal fingerprint, and send the third signal fingerprint to the smart appliance cloud server by using the sound box. The smart appliance cloud server receives the third signal fingerprint, and updates the first signal fingerprint (that is, the first signal fingerprint matching the second signal fingerprint) by using the third signal fingerprint. It should be noted that a principle of generating the third signal fingerprint is the same as that of generating the second signal fingerprint. Therefore, details are not described herein again.

To quickly perform device configuration on the socket, the smart appliance cloud server sends third configuration information to the socket by using the sound box. The third configuration information is used to indicate device configuration information of the socket disposed in the area indicated by the first area identifier. After receiving the third configuration information, the socket performs device configuration based on the third configuration information, so that the socket runs based on content configured by using the third configuration information. It should be noted that the third configuration information may include configuration information, for example, an access interface, an information reporting frequency, a data format, and a used protocol, required by the socket located in the area indicated by the first area identifier in a proper running process.

There may be more than one person living in a family, or there may be more than one person working in an office area. Therefore, to facilitate an associated user of the user (that is, a family member or a colleague of the user) to operate the socket, the user may further send an associated account (that is, a second account) of the first account to the smart appliance cloud server in advance by using the tablet computer. The smart appliance cloud server receives the second account. Based on this, after binding the first account to the socket, the smart appliance cloud server binds the socket to the second account.

On this basis, after the associated user logs in, by using the second account, to the smart appliance client on a user terminal (for example, a mobile phone, a computer, or a tablet computer) used by the associated user, the smart appliance cloud server sends the first configuration information to the user terminal of the associated user. The first configuration information includes the device identifier of the socket and the first area identifier. The user terminal of the associated user receives the first configuration information, and adds, on the interface of the smart appliance client based on the device identifier of the socket and the first area identifier in the first configuration information, the operation control of the socket located in the area indicated by the first area identifier, so that the associated user can control, based on the operation control, the socket located in the area indicated by the first area identifier.

To enable the socket to identify the associated account (that is, the second account) of the account to which the socket belongs, and when the associated user delivers a control instruction to the socket by using the smart appliance cloud server, the socket may determine, based on an account carried in the control instruction, whether the control instruction is a control instruction sent by the second account, to ensure security of socket control, the smart appliance cloud server sends the second account to the socket. The socket receives and stores the second account, to determine, after receiving the control instruction, based on a result of matching between the account carried in the control instruction and the second account, whether the control instruction is a control instruction sent by the second account.

To control operation permission of a user corresponding to the first account and operation permission of a user corresponding to the second account on the socket, the user sends fourth configuration information to the smart appliance cloud server by using the tablet computer. The fourth configuration information includes the operation permission of the first account on the socket and the operation permission of the second account on the socket. For example, the first account has read/write permission on the socket, and the second account has read permission on the socket. The smart appliance cloud server receives the fourth configuration information sent by the tablet computer. Based on this, when the user sends the control instruction for the socket to the smart appliance cloud server, the smart appliance cloud server may determine, based on the fourth configuration information and the account and instruction information carried in the control instruction, whether the user has permission to send the control instruction to the socket, and if the user has permission to send the control instruction to the socket, send the control instruction to the socket, or if the user does not have permission to send the control instruction to the socket, return, to the user, prompt information indicating that the operation exceeds the limit.

On this basis, after binding the socket to the first account, the smart appliance cloud server may send the fourth configuration information to the socket by using the sound box. The socket receives the fourth configuration information, and configures permission configuration information of the socket based on the fourth configuration information. In this way, after receiving the control instruction of the user for the socket, the socket determines, based on the account and the instruction information carried in the instruction, whether to execute the instruction.

It should be noted that the associated user may also collect the first signal fingerprint by using the user terminal, and send the first signal fingerprint and the corresponding second account to the smart appliance cloud server. After receiving the first signal fingerprint and the corresponding second account that are sent by the user terminal of the associated user, the smart appliance cloud server stores the first signal fingerprint corresponding to the second account and the first signal fingerprint corresponding to the first account together, that is, stores first signal fingerprints collected by the user and the associated user together. In this way, a quantity of first signal fingerprints is increased, the first signal fingerprint is enriched, so that a result of matching between the second signal fingerprint and the first signal fingerprint is more accurate.

To implement automatic connection between the socket and the network, the user may further send, to the smart appliance cloud server by using the tablet computer, network configuration information corresponding to the first account, and the smart appliance cloud server receives the network configuration information corresponding to the first account. In this way, after binding the socket to the first account, the smart appliance cloud server sends, to the socket by using the sound box, the network configuration information corresponding to the first account, so that the socket accesses the network based on the network configuration information corresponding to the first account. For example, if the network configuration information corresponding to the first account is an account and a password of a router, the socket is connected to the router based on the account and the password of the router, and is further connected to the network, so that the smart appliance cloud server can directly interact with the socket by using the network instead of interacting with the socket by using the restricted network of the sound box.

It should be noted that, in another embodiment of this application, when the socket is not connected to the network, various configuration information delivered by the smart appliance cloud server to the socket, various information sent by the socket to the smart appliance cloud server, and the like may be further forwarded by using the virtual SIM card, that is, information exchange between the smart appliance cloud server and the socket is implemented by using the virtual SIM card. When the socket is connected to the network, information exchange between the smart appliance cloud server and the socket is implemented by using the network without the central device and the virtual SIM card.

Figure 5:
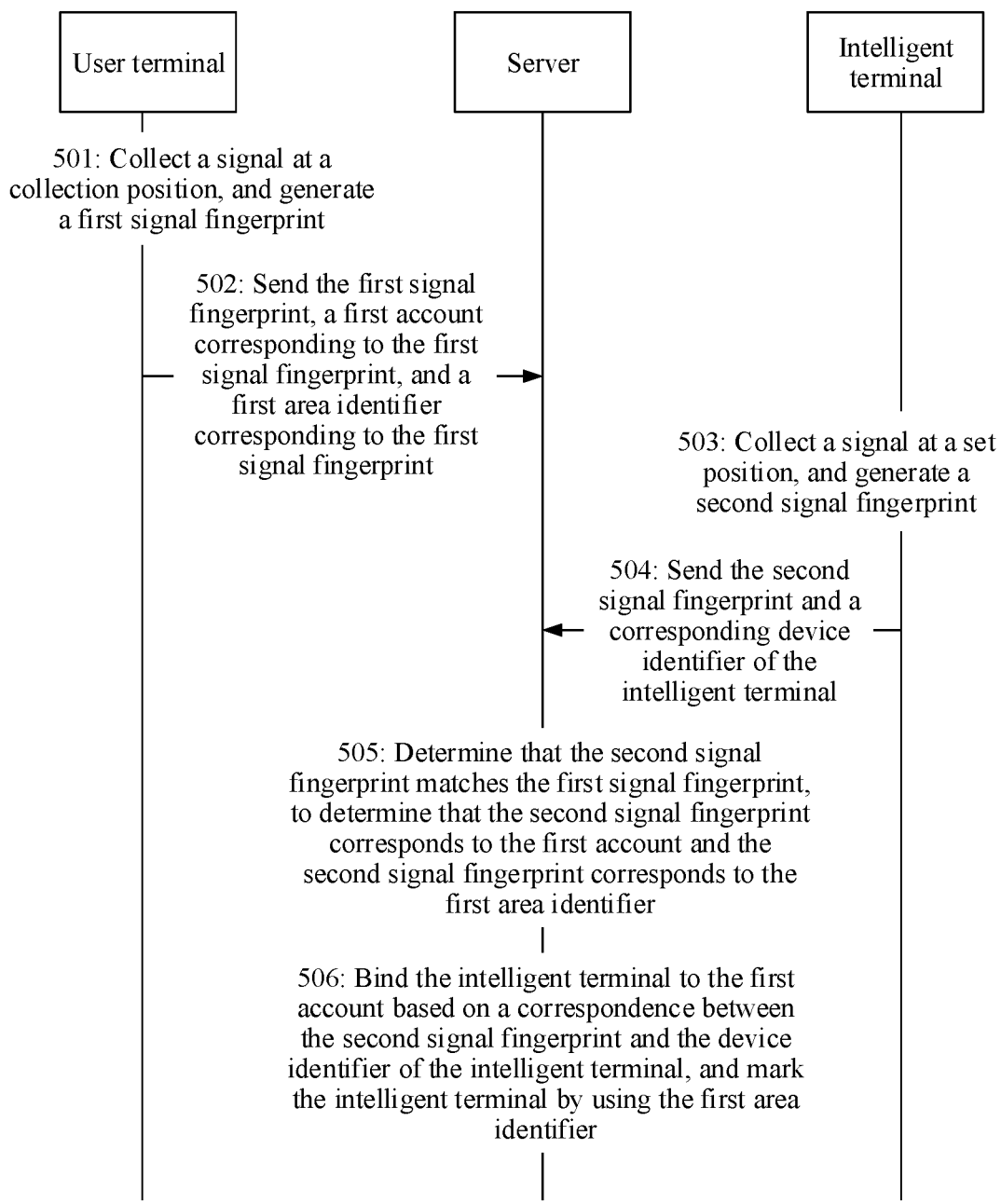
FIG. 5 is a schematic flowchart 2 of a device binding method according to an embodiment of this application.

Based on the socket binding method shown in FIG. 4A and FIG. 4B, this application provides a device binding method. FIG. 5 is a schematic flowchart 2 of a device binding method according to an embodiment of this application. As shown in FIG. 5, the device binding method includes the following steps:

501: A user terminal collects a signal at a collection position, and generates a first signal fingerprint.

502: The user terminal sends the first signal fingerprint, a first account corresponding to the first signal fingerprint, and a first area identifier corresponding to the first signal fingerprint to a server.

503: An intelligent terminal collects a signal at a set position, and generates a second signal fingerprint.

Because a principle of generating the first signal fingerprint and the second signal fingerprint has been described above, details are not described herein again.

504: The intelligent terminal sends the second signal fingerprint and a corresponding device identifier of the intelligent terminal to the server.

Specific implementation includes the following two manners:

Manner 1: The intelligent terminal sends the second signal fingerprint and the corresponding device identifier of the intelligent terminal to the server by using a central device.

Manner 2: The intelligent terminal sends the second signal fingerprint and the corresponding device identifier of the intelligent terminal to the server by using a virtual SIM card.

505: The server determines that the second signal fingerprint matches the first signal fingerprint, to determine that the second signal fingerprint is corresponding to the first account and the second signal fingerprint is corresponding to the first area identifier. That is, the server matches the second signal fingerprint with each first signal fingerprint; if one first signal fingerprint matches the second signal fingerprint, determines that the first account corresponding to the first signal fingerprint is the first account corresponding to the second signal fingerprint, that is, the second signal fingerprint corresponds to the first account corresponding to the first signal fingerprint; and determines that the first area identifier corresponding to the first signal fingerprint is the first area identifier corresponding to the second signal. Because a specific matching process of signal fingerprints has been described above, details are not described herein again.

506: The server binds the intelligent terminal to the first account based on a correspondence between the second signal fingerprint and the device identifier of the intelligent terminal, and marks the intelligent terminal by using the first area identifier. That is, the first account is determined as an account to which the intelligent terminal belongs, and the intelligent terminal is bound to the first account. This implements binding between the intelligent terminal and the account to which the intelligent terminal belongs, and an area indicated by the first area identifier is determined as an area to which the set position of the intelligent terminal belongs.

In conclusion, the user terminal collects the signal at the collection position, generates the first signal fingerprint, and sends, to the server, the first signal fingerprint, the corresponding first account, and the first area identifier corresponding to the first signal fingerprint, so that the server stores the first signal fingerprint, the corresponding first account, and the first area identifier corresponding to the first signal fingerprint. The intelligent terminal collects the signal at the set position, generates the second signal fingerprint, and sends the second signal fingerprint and the corresponding device identifier of the intelligent terminal to the server, so that after determining that the second signal fingerprint matches the first signal fingerprint, the server determines that the second signal fingerprint is corresponding to the first account and the second signal fingerprint is corresponding to the first area identifier, to bind the intelligent terminal to the first account based on the correspondence between the second signal fingerprint and the device identifier of the intelligent terminal, and mark the intelligent terminal by using the first area identifier. This implements binding between the intelligent terminal and the account to which the intelligent terminal belongs and determining of the area to which the set position of the intelligent terminal belongs. Compared with the conventional technology, in this manner, various complex configuration processes are not required, so that binding and area determining efficiency is improved, binding and area determining time is shortened, and user experience is improved. In addition, the account to which the intelligent terminal belongs and the area to which the set position belongs can be determined only through matching of signal fingerprints, so as to implement the binding between the intelligent terminal and the account to which the intelligent terminal belongs and the determining of the area to which the set position belongs. A binding step and an area determining step are simple and easy to perform.

In addition, in a related technology, a device binding method is provided. An implementation process of the device binding method is as follows:

A user registers an account on a platform, and purchases an intelligent terminal by using the account. When purchasing the intelligent terminal, a server binds the account to the purchased intelligent terminal. In this way, after the intelligent terminal is purchased home and powered on, the server determines, based on a binding relationship between the account and the intelligent terminal when the intelligent terminal is purchased, the account for purchasing the intelligent terminal as an account to which the intelligent terminal belongs, and binds the account for purchasing the intelligent terminal to the intelligent terminal, so that the user controls the intelligent terminal by using the account for purchasing the intelligent terminal. Based on this, if the user purchases an intelligent terminal for the parent by using the account of the user, according to the foregoing device binding principle, the intelligent terminal purchased by the user is bound to the account of the user for purchasing the intelligent terminal. That is, the intelligent terminal is bound to the account of the user, but cannot be bound to an account of the parent of the user. As a result, a binding error occurs, and the parent of the user cannot control the intelligent terminal by using the account of the parent.

However, in the device binding method provided in this embodiment of this application, because determining of the account (that is, the first account) to which the intelligent terminal belongs is related to the second signal fingerprint corresponding to the set position of the intelligent terminal and the first signal fingerprint corresponding to the collection position, and is irrelevant to an account for purchasing the intelligent terminal, accurate binding of the intelligent terminal can be implemented.

In this embodiment of this application, after binding the intelligent terminal to the first account, the server may further send first configuration information to the user terminal. The first configuration information includes the device identifier and the first area identifier of the intelligent terminal and the like, so that an operation control of the intelligent terminal is added to the user terminal based on the device identifier and the first area identifier of the intelligent terminal in the first configuration information, and the user controls, based on the operation control, the intelligent terminal disposed in the area indicated by the first area identifier.

To enable the intelligent terminal to identify the account to which the intelligent terminal belongs and the area to which the set position belongs, that is, the first account and the area indicated by the first area identifier, and when the user delivers, by using the server, a control instruction to the intelligent terminal located in the area indicated by the first area identifier, the intelligent terminal may determine, based on an account and an area identifier that are carried in the control instruction, whether the control instruction is a control instruction that is sent by the account to which the intelligent terminal belongs to the intelligent terminal located in the area indicated by the first area identifier, to ensure security of intelligent terminal control, the server may send second configuration information to the intelligent terminal. The second configuration information includes the first account and the first area identifier. The intelligent terminal receives and stores the second configuration information. In this way, after receiving the control instruction, the intelligent terminal compares the account carried in the control instruction with the first account stored in the intelligent terminal, and compares the area identifier carried in the control instruction with the first area identifier stored in the intelligent terminal. If the accounts and area identifiers are consistent, the control instruction is sent by the account to which the intelligent terminal belongs to the intelligent terminal disposed in the area indicated by the first area identifier, and the intelligent terminal executes the control instruction. If the accounts and area identifiers are inconsistent, the control instruction is not sent by the account to which the intelligent terminal belongs to the intelligent terminal disposed in the area indicated by the first area identifier, and the intelligent terminal does not execute the control instruction.

When a placement position of a home appliance of the user changes, or a deployment position of Wi-Fi, Bluetooth, or the like of the user changes, or a deployment position of Wi-Fi, Bluetooth, or the like of next door, upstairs, or downstairs changes, or a placement position of a home appliance of next door, upstairs, or downstairs changes, or a signal identifier of upstairs, next door, downstairs, or the home of the user is modified, signal strength and/or signal identifier information of a signal collected at a same collection position changes. Consequently, a first signal fingerprint corresponding to the same collection position changes. Therefore, to ensure accuracy and effectiveness of the first signal fingerprint corresponding to the collection position, the intelligent terminal may further collect a signal at the set position, generate a third signal fingerprint, and send the third signal fingerprint to the server. The server receives the third signal fingerprint, and updates the first signal fingerprint (that is, the first signal fingerprint matching the second signal fingerprint) by using the third signal fingerprint.

To quickly perform device configuration on the intelligent terminal, the server sends third configuration information to the intelligent terminal. The third configuration information is used to indicate device configuration information of the intelligent terminal disposed in the area indicated by the first area identifier. After receiving the third configuration information, the intelligent terminal performs device configuration based on the third configuration information, so that the intelligent terminal runs based on content configured by using the third configuration information. It should be noted that the third configuration information may include configuration information, for example, an access interface, an information reporting frequency, a data format, and a used protocol, required by the intelligent terminal located in the area indicated by the first area identifier in a proper running process.

There may be more than one person living in a family, or there may be more than one person working in an office area. Therefore, to facilitate an associated user of the user (that is, a family member or a colleague of the user) to operate the intelligent terminal, the user may further send an associated account (that is, a second account) of the first account to the server in advance by using the user terminal. The server receives the second account. Based on this, after binding the first account to the intelligent terminal, the server binds the intelligent terminal to the second account.

On this basis, after the associated user logs in, by using the second account, to the smart appliance client on a user terminal (for example, a mobile phone, a computer, or a tablet computer) used by the associated user, the smart appliance cloud server sends the first configuration information to the user terminal of the associated user. The first configuration information includes the device identifier of the intelligent terminal and the first area identifier. The user terminal of the associated user receives the first configuration information, and adds, on the interface of the smart appliance client based on the device identifier of the intelligent terminal and the first area identifier in the first configuration information, the operation control of the intelligent terminal located in the area indicated by the first area identifier, so that the associated user can control, based on the operation control, the intelligent terminal located in the area indicated by the first area identifier.

To enable the intelligent terminal to identify the associated account (that is, the second account) of the account to which the intelligent terminal belongs, and when the associated user delivers the control instruction to the intelligent terminal by using the server, the intelligent terminal may determine, based on the account carried in the control instruction, whether the control instruction is the control instruction sent by the second account, so as to ensure control security of the intelligent terminal, the server sends the second account to the intelligent terminal. The intelligent terminal receives and stores the second account, to determine, after receiving the control instruction, based on a result of matching between the account carried in the control instruction and the second account, whether the control instruction is a control instruction sent by the second account.

To control operation permission of a user corresponding to the first account and operation permission of a user corresponding to the second account on the intelligent terminal, the user sends fourth configuration information to the server by using the user terminal. The fourth configuration information includes the operation permission of the first account on the intelligent terminal and the operation permission of the second account on the intelligent terminal. Based on this, when the user sends the control instruction for the intelligent terminal to the server, the server may determine, based on the fourth configuration information and the account and instruction information carried in the control instruction, whether the user has permission to send the instruction to the intelligent terminal, and if the user has permission to send the instruction to the intelligent terminal, send the control instruction to the intelligent terminal, or if the user does not have permission to send the instruction to the intelligent terminal, return, to the user, prompt information indicating that the operation exceeds the limit.

On this basis, after binding the intelligent terminal to the first account, the server may send the fourth configuration information to the intelligent terminal. The intelligent terminal receives the fourth configuration information, and configures permission configuration information of the intelligent terminal based on the fourth configuration information. In this way, after receiving the control instruction of the user for the intelligent terminal, the intelligent terminal determines, based on the account and the instruction information carried in the instruction, whether to execute the instruction.

It should be noted that the associated user may also collect the first signal fingerprint by using the user terminal, and send, to the server, the first signal fingerprint, the corresponding second account, and the first area identifier corresponding to the first signal fingerprint. After receiving the first signal fingerprint, the corresponding second account, and the first area identifier corresponding to the first signal fingerprint that are sent by the user terminal of the associated user, the smart appliance cloud server stores the first signal fingerprint corresponding to the second account and the first signal fingerprint corresponding to the first account together, that is, stores first signal fingerprints collected by the user and the associated user together. In this way, a quantity of first signal fingerprints is increased, the first signal fingerprint is enriched, so that a result of matching between the second signal fingerprint and the first signal fingerprint is more accurate.

To implement automatic connection between the intelligent terminal and the network, the user may further send, to the server by using the user terminal, network configuration information corresponding to the first account, and the server receives the network configuration information corresponding to the first account. In this way, after binding the intelligent terminal to the first account, the server sends, to the intelligent terminal, the network configuration information corresponding to the first account, so that the intelligent terminal accesses the network based on the network configuration information corresponding to the first account.

It should be noted that, when the intelligent terminal is not connected to the network, interaction between the intelligent terminal and the server may be implemented by using the central device or the virtual SIM card. When the intelligent terminal is connected to the network, interaction between the intelligent terminal and the server is directly implemented by using the network without the central device and the virtual SIM card.

An embodiment of this application further provides a terminal device. The terminal device includes a communication module, one or more memories, and one or more processors. The communication module is configured to communicate with another device. The one or more memories are configured to store one or more computer programs. The one or more processors are configured to execute the one or more computer programs, so that the terminal device performs the method according to any one of the foregoing user terminals.

It should be noted that the terminal device herein refers to a user terminal, and the user terminal may be, for example, a terminal device having a man-machine interaction function, such as a mobile phone or a tablet computer. The following describes a structure of the user terminal by using an example in which the user terminal is a mobile phone.

Figure 6:
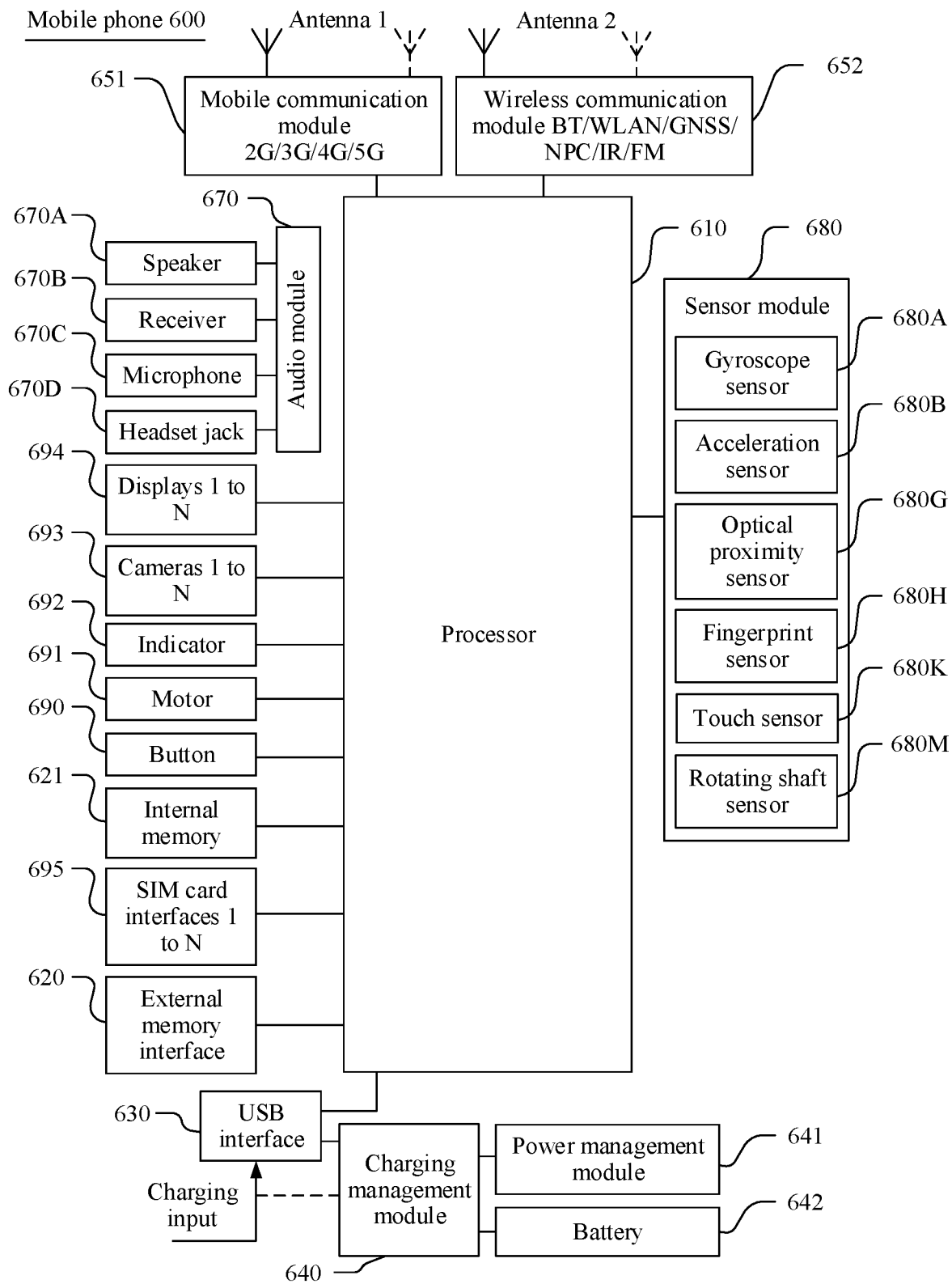
FIG. 6 is a schematic diagram of a structure of a mobile phone according to an embodiment of this application.

FIG. 6 is a schematic diagram of a structure of a mobile phone according to an embodiment of this application.

The mobile phone 600 may include a processor 610, an external memory interface 620, an internal memory 621, a USB interface 630, a charging management module 640, a power management module 641, a battery 642, an antenna 1, an antenna 2, a mobile communication module 651, a wireless communication module 652, an audio module 670, a speaker 670A, a receiver 670B, a microphone 670C, a headset jack 670D, a sensor module 680, a button 690, a motor 691, an indicator 692, a camera 693, a display 694, a SIM card interface 695, and the like. The sensor module 680 may include a gyroscope sensor 680A, an acceleration sensor 680B, an optical proximity sensor 680G, a fingerprint sensor 680H, a touch sensor 680K, and a rotating shaft sensor 680M (certainly, the mobile phone 600 may further include another sensor, for example, a temperature sensor, a pressure sensor, a distance sensor, a magnetic sensor, an ambient light sensor, a barometric pressure sensor, or a bone conduction sensor, which is not shown in the figure).

It may be understood that the structure illustrated in this embodiment of this application does not constitute a specific limitation on the mobile phone 600. In some other embodiments of this application, the mobile phone 600 may include more or fewer components than those shown in the figure, or combine some components, or split some components, or have different component arrangements. The components shown in the figure may be implemented by hardware, software, or a combination of software and hardware.

The processor 610 may include one or more processing units. For example, the processor 610 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 600. The controller may generate an operation control signal based on an instruction operation code and a time sequence signal, to complete control of instruction reading and instruction execution.

A memory may be further disposed in the processor 610, and is configured to store instructions and data. In some embodiments, the memory in the processor 610 is a cache. The memory may store instructions or data just used or cyclically used by the processor 610. If the processor 610 needs to use the instructions or the data again, the processor may directly invoke the instructions or the data from the memory. This avoids repeated access, reduces waiting time of the processor 610, and improves system efficiency.

The processor 610 may run the execution method of the user terminal provided in this application, collect a first signal fingerprint corresponding to a first account, and send the first account and the first signal fingerprint corresponding to the first account to a server, to provide data support for binding between an intelligent terminal and an account to which the intelligent terminal belongs. When different components are integrated into the processor 610, for example, a CPU and a GPU are integrated, the CPU and the GPU may cooperate to perform the processing method provided in embodiments of this application. For example, in the processing method, some algorithms are performed by the CPU, and the other algorithms are performed by the GPU, to obtain relatively fast processing efficiency.

The display 694 is configured to display an image, a video, and the like. The display 694 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 600 may include one or N displays 694, where N is a positive integer greater than 1.

The camera 693 (which may be a front-facing camera or a rear-facing camera, or one camera may serve as either a front-facing camera or a rear-facing camera) is used to capture a static image or video. Generally, the camera 693 may include a photosensitive element such as a lens group and an image sensor. The lens group includes a plurality of lenses (convex lenses or concave lenses), and is configured to collect an optical signal reflected by a to-be-photographed object and transmit the collected optical signal to the image sensor. The image sensor generates an original image of the to-be-photographed object based on the optical signal.

The internal memory 621 may be configured to store computer-executable program code. The executable program code includes instructions. The processor 610 runs the instructions stored in the internal memory 621, to perform various function applications of the mobile phone 600 and signal processing. The internal memory 621 may include a program storage area and a data storage area. The program storage area may store code of an operating system, an application (for example, a camera application or a WeChat application), and the like. The data storage area may store data (for example, an image or video captured by the camera application) created during use of the mobile phone 600, and the like.

The internal memory 621 may further store code of an anti-accidental touch algorithm. When the code of the anti-accidental touch algorithm stored in the internal memory 621 is run by the processor 610, a touch operation in a folding or unfolding process may be shielded.

In addition, the internal memory 621 may include a high-speed random access memory, or may include a non-volatile memory, for example, at least one magnetic disk storage device, a flash memory, or a universal flash storage (UFS).

Certainly, code of an algorithm for implementing device binding provided in this embodiment of this application may alternatively be stored in an external memory. In this case, the processor 610 may run, by using the external memory interface 620, the code of the algorithm stored in the external memory, to implement device binding.

The following describes functions of the sensor module 680.

The gyroscope sensor 680A may be configured to determine a motion posture of the mobile phone 600. In some embodiments, the gyroscope sensor 680A may be used to determine angular velocities of the mobile phone 600 around three axes (namely, x, y, and z axes). In other words, the gyroscope sensor 680A may be configured to detect a current motion status of the mobile phone 600, for example, a shaken or static state.

The acceleration sensor 680B may detect values of acceleration in various directions (usually on three axes) of the mobile phone 600. In other words, the gyroscope sensor 680A may be configured to detect a current motion status of the mobile phone 600, for example, a shaken or static state.

The optical proximity sensor 680G may include, for example, a light emitting diode (LED) and an optical detector, for example, a photodiode. The light emitting diode may be an infrared light emitting diode. The mobile phone emits infrared light by using the light emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone.

The gyroscope sensor 680A (or the acceleration sensor 680B) may send detected motion status information (for example, an angular velocity) to the processor 610. The processor 610 determines, based on the motion status information, whether the mobile phone is currently in a handheld state or a tripod state (for example, when the angular velocity is not 0, it indicates that the mobile phone 600 is in the handheld state).

The fingerprint sensor 680H is configured to collect a fingerprint. The mobile phone 600 may use a feature of the collected fingerprint to implement fingerprint-based unlocking, application access locking, fingerprint-based photographing, fingerprint-based call answering, and the like.

The touch sensor 680K is also referred to as a "touch panel". The touch sensor 680K may be disposed on the display 694, and the touch sensor 680K and the display 694 form a touchscreen, which is also referred to as a "touch screen". The touch sensor 680K is configured to detect a touch operation performed on or near the touch sensor. The touch sensor may transfer the detected touch operation to the application processor to determine a type of the touch event. A visual output related to the touch operation may be provided through the display 694. In some other embodiments, the touch sensor 680K may alternatively be disposed on a surface of the mobile phone 600, and is located on a position different from that of the display 694.

For example, the display 694 of the mobile phone 600 displays a home screen, and the home screen includes icons of a plurality of applications (for example, the camera application and the WeChat application). A user taps the icon of the camera application on the home screen by using the touch sensor 680K, to trigger the processor 610 to enable the camera application and turn on the camera 693. The display 694 displays an interface of the camera application, for example, a viewfinder interface.

A wireless communication function of the mobile phone 600 may be implemented through the antenna 1, the antenna 2, the mobile communication module 651, the wireless communication module 652, the modem processor, the baseband processor, and the like.

The antenna 1 and the antenna 2 are configured to transmit and receive an electromagnetic wave signal. Each antenna in the mobile phone 600 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 651 may provide a solution to wireless communication such as 2G/3G/4G/5G applied to the mobile phone 600. The mobile communication module 651 may include at least one filter, a switch, a power amplifier, a low noise amplifier (LNA), and the like. The mobile communication module 651 may receive an electromagnetic wave through the antenna 1, perform processing such as filtering or amplification on the received electromagnetic wave, and transmit the electromagnetic wave to the modem processor for demodulation. The mobile communication module 651 may further amplify a signal modulated by the modem processor, and convert the signal into an electromagnetic wave for radiation through the antenna 1. In some embodiments, at least some function modules in the mobile communication module 651 may be disposed in the processor 610. In some embodiments, at least some function modules of the mobile communication module 651 may be disposed in a same device as at least some modules of the processor 610.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 670A, the receiver 670B, or the like), or displays an image or a video by using the display 694. In some embodiments, the modem processor may be an independent component. In some other embodiments, the modem processor may be independent of the processor 610, and is disposed in a same device as the mobile communication module 651 or another function module.

The wireless communication module 652 may provide a solution to wireless communication applied to the mobile phone 600, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 652 may be one or more components integrating at least one communication processor module. The wireless communication module 652 receives an electromagnetic wave through the antenna 2, performs frequency modulation and filtering processing on an electromagnetic wave signal, and sends a processed signal to the processor 610. The wireless communication module 652 may further receive a to-be-sent signal from the processor 610, perform frequency modulation and amplification on the signal, and convert the signal into an electromagnetic wave for radiation through the antenna 2.

In some embodiments, in the mobile phone 600, the antenna 1 and the mobile communication module 651 are coupled, and the antenna 2 and the wireless communication module 652 are coupled, so that the mobile phone 600 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In addition, the mobile phone 600 may implement an audio function such as music playing or recording through the audio module 670, the speaker 670A, the receiver 670B, the microphone 670C, the headset jack 670D, the application processor, and the like. The mobile phone 600 may receive an input from the button 690, and generate a button signal input related to a user setting and function control of the mobile phone 600. The mobile phone 600 may generate a vibration prompt (for example, an incoming call vibration prompt) by using the motor 691. The indicator 692 in the mobile phone 600 may be an indicator light, and may be configured to indicate a charging status and a power change, or may be configured to indicate a message, a missed call, a notification, and the like. The SIM card interface 695 in the mobile phone 600 is configured to connect to a SIM card. The SIM card may be inserted into the SIM card interface 695 or removed from the SIM card interface 695, to implement contact with or separation from the mobile phone 600.

It should be understood that, during actual application, the mobile phone 600 may include more or fewer components than components shown in FIG. 6. This is not limited in this embodiment of this application.

An embodiment of this application further provides a terminal device. The terminal device includes a communication module, one or more memories, and one or more processors. The communication module is configured to communicate with another device. The one or more memories are configured to store one or more computer programs. The one or more processors are configured to execute the one or more computer programs, so that the terminal device performs the method according to any one of the foregoing intelligent terminals.

It should be noted that the terminal device herein refers to an intelligent terminal. The intelligent terminal, may be, for example, a lamp, a socket, a refrigerator, a washing machine, an air conditioner, an oven, a rice cooker, a television set, or a floor sweeping robot. This is not specially limited herein. The following describes a structure of the intelligent terminal by using an example in which the intelligent terminal is a refrigerator.

Figure 7:
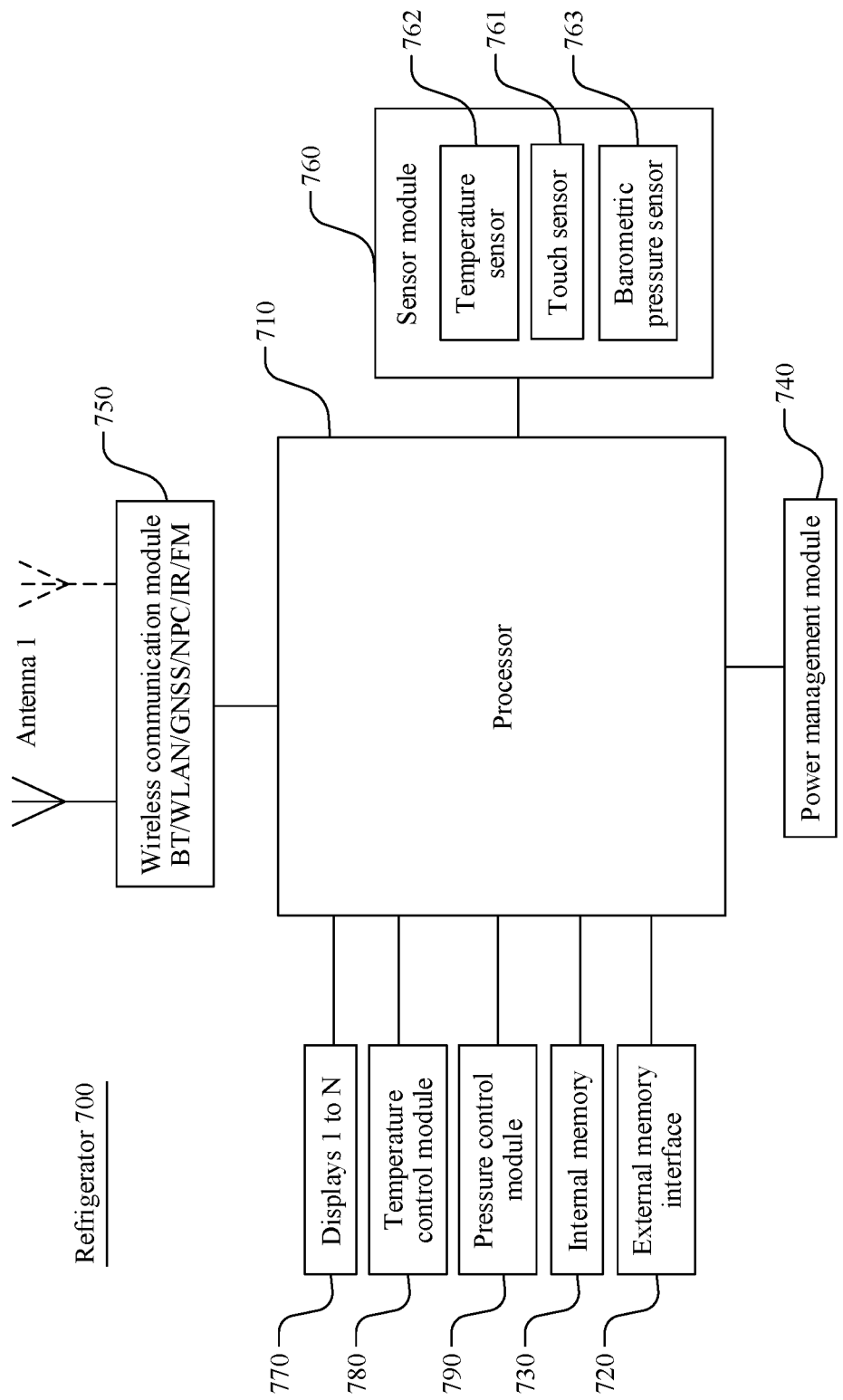
FIG. 7 is a schematic diagram of a structure of a refrigerator according to an embodiment of this application.

FIG. 7 is a schematic diagram of a structure of a refrigerator according to an embodiment of this application.

The refrigerator 700 may include a processor 710, an external memory interface 720, an internal memory 730, a power management module 740, a wireless communication module 750, an antenna 1, a sensor module 760, a display 770, at least one storage structure (not shown in the figure), a temperature control module 780, a pressure control module 790, and the like. The sensor module 760 may include a touch sensor 761, a temperature sensor 762, a barometric pressure sensor 763, and the like.

It may be understood that the structure illustrated in this embodiment of this application does not constitute a specific limitation on the refrigerator 700. In some other embodiments of this application, the refrigerator 700 may include more or fewer components than those shown in the figure, or combine some components, or split some components, or have different component arrangements. The components shown in the figure may be implemented by hardware, software, or a combination of software and hardware.

The processor 710 may include one or more processing units. For example, the processor 710 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the refrigerator 700. The controller may generate an operation control signal based on an instruction operation code and a time sequence signal, to complete control of instruction reading and instruction execution.

A memory may be further disposed in the processor 710, and is configured to store instructions and data. In some embodiments, the memory in the processor 710 is a cache. The memory may store instructions or data just used or cyclically used by the processor 710. If the processor 710 needs to use the instructions or the data again, the processor may directly invoke the instructions or the data from the memory. This avoids repeated access, reduces waiting time of the processor 710, and improves system efficiency.

The processor 710 may run the method performed by the intelligent terminal provided in this application, collect a second signal fingerprint, and send the second signal fingerprint and a device identifier of the refrigerator to a server, so that the server can determine, based on the second signal fingerprint, an account to which the refrigerator belongs, to bind the refrigerator to the account to which the refrigerator belongs. When different components are integrated into the processor 710, for example, a CPU and a GPU are integrated, the CPU and the GPU may cooperate to perform the processing method provided in embodiments of this application. For example, in the processing method, some algorithms are performed by the CPU, and the other algorithms are performed by the GPU, to obtain relatively fast processing efficiency.

The display 770 is configured to display an image, a video, and the like. The display 570 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the refrigerator 700 may include one or N displays 770, where N is a positive integer greater than 1.

The internal memory 730 may be configured to store computer-executable program code. The executable program code includes instructions. The processor 710 runs the instructions stored in the internal memory 730, to perform various function applications of the refrigerator 700 and signal processing. The internal memory 730 may include a program storage area and a data storage area. The program storage area may store code of an operating system, an application (for example, a camera application or a WeChat application), and the like. The data storage area may store data created during use of the refrigerator 700.

The internal memory 730 may further store code of an anti-accidental touch algorithm. When the code of the anti-accidental touch algorithm stored in the internal memory 730 is run by the processor 710, a touch operation in a folding or unfolding process may be shielded.

In addition, the internal memory 730 may include a high-speed random access memory, or may include a non-volatile memory, for example, at least one magnetic disk storage device, a flash memory, or a universal flash storage (UFS).

Certainly, code of an algorithm for implementing device binding provided in this embodiment of this application may alternatively be stored in an external memory. In this case, the processor 710 may run, by using the external memory interface 720, the code of the algorithm stored in the external memory, to implement device binding.

The following describes functions of the sensor module 760.

The touch sensor 761 is also referred to as a "touch panel". The touch sensor 761 may be disposed on the display 770, and the touch sensor 761 and the display 770 form a touchscreen, which is also referred to as a "touch screen". The touch sensor 770 is configured to detect a touch operation performed on or near the touch sensor. The touch sensor may transfer the detected touch operation to the application processor to determine a type of the touch event. A visual output related to the touch operation may be provided through the display 770. In some other embodiments, the touch sensor 761 may alternatively be disposed on a surface of the refrigerator 700, and is located on a position different from that of the display 770.

The temperature sensor 762 is disposed inside the refrigerator 700, and is configured to detect a temperature in the refrigerator 700 and send the detected temperature to the processor 710, so that the processor 710 determines, based on the temperature detected by the temperature sensor 762, whether the temperature in the refrigerator 700 is normal, and if the temperature in the refrigerator 700 is abnormal, generates a temperature adjustment solution, and sends a temperature adjustment method to the temperature control module 780, so that the temperature control module 580 adjusts the temperature in the refrigerator 700 according to the temperature adjustment method.

The barometric pressure sensor 763 is disposed inside the refrigerator 700, and is configured to detect barometric pressure in the refrigerator 700 and send the detected barometric pressure to the processor 710, so that the processor 710 determines, based on the barometric pressure detected by the barometric pressure sensor 763, whether the barometric pressure in the refrigerator 700 is normal. If the barometric pressure in the refrigerator 700 is abnormal, the processor 710 generates a barometric pressure adjustment solution, and sends a barometric pressure adjustment method to the pressure control module 790, so that the pressure control module 790 adjusts the barometric pressure in the refrigerator 700 according to the barometric pressure adjustment method.

For example, the display 770 of the refrigerator 700 displays a home screen, and the home screen includes icons of a plurality of applications (for example, recipes and home tips). A user taps the icon of the recipe application on the home screen by using the touch sensor 761, to trigger the processor 710 to enable the recipe application and open the recipe. The display 770 displays a display interface of the recipe.

A wireless communication function of the refrigerator 700 may be implemented through the antenna 1, the wireless communication module 750, the modem processor, the baseband processor, and the like.

The antenna 1 is configured to transmit and receive an electromagnetic wave signal. Antennas in the refrigerator 700 may be configured to cover one or more communication bands.

The wireless communication module 750 may provide a wireless communication solution that includes a wireless local area network (WLAN) (for example, a wireless fidelity (Wi-Fi) network), Bluetooth (BT), and the like and that is applied to the refrigerator 700. The wireless communication module 750 may be one or more components integrating at least one communication processor module. The wireless communication module 750 receives an electromagnetic wave by using the antenna 1, performs frequency modulation and filtering processing on an electromagnetic wave signal, and sends a processed signal to the processor 710. The wireless communication module 750 may further receive a to-be-sent signal from the processor 710, perform frequency modulation and amplification on the signal, and convert the signal into an electromagnetic wave for radiation through the antenna 1.

It should be understood that, during actual application, the refrigerator 700 may include more or fewer components than components shown in FIG. 7. This is not limited in this embodiment of this application.

An embodiment of this application further provides a terminal device. The terminal device includes a communication module, one or more memories, and one or more processors. The communication module is configured to communicate with another device. The one or more memories are configured to store one or more computer programs. The one or more processors are configured to execute the one or more computer programs, so that the terminal device performs the method according to any one of the foregoing servers.

It should be noted that the terminal device herein refers to a server, and the server may be a physical server or a cloud server. The following describes a structure of a server by using an example in which the server is a physical server.

Figure 8:
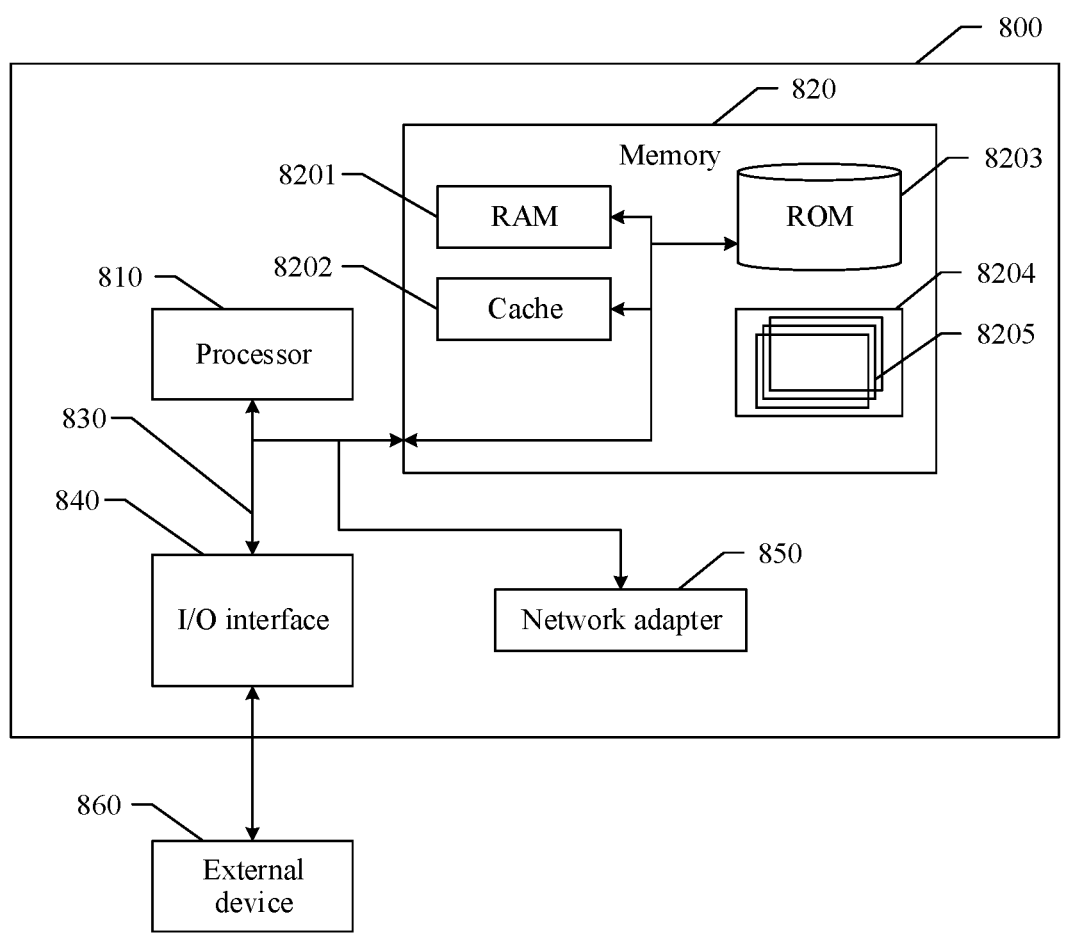
FIG. 8 is a schematic diagram of a structure of a physical server according to an embodiment of this application.

FIG. 8 is a schematic diagram of a structure of a physical server according to an embodiment of this application.

The physical server 800 shown in FIG. 8 is merely an example, and shall not constitute any limitation on a function and an application scope of this embodiment of the present invention.

As shown in FIG. 8, components of the physical server 800 may include but are not limited to the foregoing at least one processor 810, at least one memory 820, and a bus 830 that connects different system components (including the memory 820 and the processor 810).

The memory 820 stores a computer program, and the computer program may be executed by the processor 810, so that the processor 810 performs the steps performed by the server described in this specification.

The memory 820 may include a volatile memory, for example, a random access memory (RAM) 8201 and/or a cache memory 8202, and may further include a read-only memory (ROM) 8203.

The memory 820 may further include a program/utility tool 8204 with a set of (at least one) program modules 8205. Such program module 8205 includes but is not limited to an operating system, one or more application programs, and another program module and program data. Each or a combination of these examples may include implementation of a network environment.

The bus 830 may include a data bus, an address bus, and a control bus.

The physical server 800 may also communicate with one or more external devices 860 (for example, a keyboard, a pointing device, or a Bluetooth device). Such communication may be performed by using an input/output (I/O) interface 840. The physical server 800 may further communicate with one or more networks (for example, a local area network (LAN), a wide area network (WAN), and/or a public network such as the Internet) by using a network adapter 850. As shown in the figure, the network adapter 850 communicates with another module of the physical server 800 through the bus 830. It should be understood that, although not shown in the figure, other hardware and/or software modules, which include but are not limited to micro code, a device drive, a redundancy processing unit, an external disk drive array, a RAID system, a tape drive, a data backup storage system, and the like, may be used in combination with the physical server 800.

This application further provides a computer-readable storage medium, including a computer program. When the computer program is executed on a computer, the computer is enabled to perform any method performed by the user terminal, any method performed by the server, or any method performed by the intelligent terminal.

This application further provides a computer program. When the computer program is executed by a computer, the computer program is configured to perform any method performed by the user terminal, any method performed by the server, or any method performed by the intelligent terminal.

This application further provides a chip, including a processor and a memory. The memory is configured to store a computer program. The processor is configured to invoke and run the computer program stored in the memory, to perform any method performed by the user terminal, any method performed by the server, or any method performed by the intelligent terminal.

Further, the chip may include a memory and a communication interface. The communication interface may be an input/output interface, a pin, an input/output circuit, or the like.

In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device binding method for a server, wherein the method is applied to a smart home and the method comprises:
   receiving a first signal fingerprint, a first area identifier and a first account corresponding to the first signal fingerprint that are sent by a user terminal, wherein the first signal fingerprint is generated by a first signal collected by the user terminal at a collection position in the smart home, based on identification information of the first signal at the collection position, signal strength of the first signal at the collection position, and at least one of a signal class, a signal timestamp and a change speed of the signal strength of the first signal at the collection position;
       wherein an identifier of an area corresponding to the collection position is set as the first area identifier which corresponds to the first signal fingerprint;
   receiving a second signal fingerprint and a device identifier of an intelligent terminal corresponding to the second signal fingerprint that are sent by the intelligent terminal, wherein the second signal fingerprint is generated by a second signal collected by the intelligent terminal at a set position in the smart home, based on identification information of the second signal at the set position, signal strength of the second signal at the set position, and at least one of a signal class, a signal timestamp and a change speed of the signal strength of the second signal at the set position;
   determining that the second signal fingerprint matches the first signal fingerprint, to determine that the second signal fingerprint corresponds to the first account; and
   binding the intelligent terminal to the first account based on a correspondence between the second signal fingerprint and the device identifier of the intelligent terminal.

2. The method according to claim 1, further comprising:
   determining that the second signal fingerprint matches the first signal fingerprint, to determine that the second signal fingerprint corresponds to the first area identifier; and
   marking the intelligent terminal by using the first area identifier based on the correspondence between the second signal fingerprint and the device identifier of the intelligent terminal.

3. The method according to claim 2, further comprising:
   sending first configuration information to the user terminal, wherein the first configuration information comprises the device identifier of the intelligent terminal and the first area identifier, so that the user terminal sets an operation control of the intelligent terminal based on the first configuration information.

4. The method according to claim 2, further comprising:
   sending second configuration information to the intelligent terminal, wherein the second configuration information comprises the first account and the first area identifier, so that the intelligent terminal determines, based on the second configuration information, an account and an area to which the intelligent terminal belongs.

5. The method according to claim 2, further comprising:
   receiving a third signal fingerprint sent by the intelligent terminal, wherein the third signal fingerprint is generated by the signal collected by the intelligent terminal at the set position; and
   updating the first signal fingerprint by using the third signal fingerprint.

6. The method according to claim 2, further comprising:
   sending third configuration information to the intelligent terminal, wherein the third configuration information indicates device configuration information of the intelligent terminal that is disposed in an area indicated by the first area identifier, so that the intelligent terminal performs device configuration based on the third configuration information.

7. The method according to claim 1, further comprising:
   receiving fourth configuration information sent by the user terminal, wherein
   the fourth configuration information comprises operation permission of the first account for the intelligent terminal and operation permission of the second account for the intelligent terminal; and
   sending the fourth configuration information to the intelligent terminal, so that the intelligent terminal determines the operation permission of the first account and the operation permission of the second account based on the fourth configuration information.

8. A device binding method for a user terminal, wherein the method is applied to a smart home and the method comprises:
   collecting a first signal at a collection position in the smart home, and generating a first signal fingerprint, based on identification information of the first signal at the collection position, signal strength of the first signal at the collection position, and at least one of a signal class, a signal timestamp and a change speed of the signal strength of the first signal at the collection position;
   sending the first signal fingerprint, a first area identifier and a first account corresponding to the first signal fingerprint to a server, so that after determining that a second signal fingerprint that is sent by an intelligent terminal and that is at a set location matches the first signal fingerprint, the server marks the intelligent terminal by using the first area identifier and binds the intelligent terminal to the first account, wherein the second signal fingerprint is generated by a second signal collected by the intelligent terminal at the set position in the smart home, based on identification information of the second signal at the set position, signal strength of the second signal at the set position, and at least one of a signal class, a signal timestamp and a change speed of the signal strength of the second signal at the set position; and wherein an identifier of an area corresponding to the collection position is set as the first area identifier which corresponds to the first signal fingerprint.

9. The method according to claim 8, further comprising:
receiving first configuration information sent by the server, wherein the first configuration information comprises a device identifier of the intelligent terminal and the first area identifier; and
setting an operation control of the intelligent terminal based on the first configuration information.

10. The method according to claim 8, further comprising:
sending fourth configuration information to the server, wherein the fourth configuration information comprises operation permission of the first account for the intelligent terminal and operation permission of a second account for the intelligent terminal, and the second account is associated with the first account, so that the server determines the operation permission of the first account and the operation permission of the second account based on the fourth configuration information.

11. A device binding method for an intelligent terminal, wherein the method is applied to a smart home and the method comprises:
collecting a second signal at a set position, and generating a second signal fingerprint by a second signal collected by the intelligent terminal at the set position in the smart home, based on identification information of the second signal at the set position, signal strength of the second signal at the set position, and at least one of a signal class, a signal timestamp and a change speed of the signal strength of the second signal at the set position;
receiving a first area identifier which corresponds to a first signal fingerprint that is generated by a user terminal at a collection position in the smart home, wherein an identifier of an area corresponding to the collection position is set as the first area identifier,. and wherein the first signal fingerprint is generated by a first signal collected by the user terminal at the collection position in the smart home, based on identification information of the first signal at the collection position, signal strength of the first signal at the collection position, and at least one of a signal class, a signal timestamp and a change speed of the signal strength of the first signal at the collection position; and sending the second signal fingerprint and a device identifier of the intelligent terminal corresponding to the second signal fingerprint to a server, so that after determining that the second signal fingerprint matches the first signal fingerprint sent by the user terminal, the server marks the intelligent terminal by using the first area identifier and binds the intelligent terminal to a first account corresponding to the first signal fingerprint.

12. The method according to claim 11, further comprising:
receiving second configuration information sent by the server, wherein
the second configuration information comprises the first account and the first area identifier; and
determining, based on the second configuration information, an account and an area to which the intelligent terminal belongs.

13. The method according to claim 11, further comprising:
collecting a signal at the set position, and generating a third signal fingerprint; and
sending the third signal fingerprint to the server, so that the server updates the first signal fingerprint by using the third signal fingerprint.

14. The method according to claim 11, further comprising:
receiving third configuration information sent by the server, wherein the third configuration information indicates device configuration information of the intelligent terminal that is disposed in an area indicated by the first area identifier; and
performing device configuration based on the third configuration information.

15. The method according to claim 11, further comprising:
receiving fourth configuration information sent by the server, wherein the fourth configuration information comprises operation permission of the first account for the intelligent terminal and operation permission of a second account for the intelligent terminal, and the second account is associated with the first account; and
determining the operation permission of the first account and the operation permission of the second account based on the fourth configuration information.

* * * * *

UNITED STATES PATENT AND TRADEMARK OFFICE
CERTIFICATE OF CORRECTION

PATENT NO. : 11,996,978 B2
APPLICATION NO. : 17/919199
DATED : May 28, 2024
INVENTOR(S) : Yin et al.

Page 1 of 1

It is certified that error appears in the above-identified patent and that said Letters Patent is hereby corrected as shown below:

In the Claims

Claim 11, Column 47, Line 39: "position is set as the first area identifier,. and wherein" should read -- position is set as the first area identifier, and wherein --.

Signed and Sealed this
Fifteenth Day of April, 2025

Coke Morgan Stewart
*Acting Director of the United States Patent and Trademark Office*